(12) United States Patent
Yu et al.

(10) Patent No.: US 10,142,217 B2
(45) Date of Patent: Nov. 27, 2018

(54) LOOP AVOIDANCE METHOD, DEVICE AND SYSTEM

(71) Applicant: Huawei Technologies Co., Ltd., Shenzhen (CN)

(72) Inventors: Bin Yu, Nanjing (CN); Xiaohu Tang, Nanjing (CN); Ting Xu, Nanjing (CN)

(73) Assignee: Huawei Technologies Co., Ltd, Shenzhen (CN)

(*) Notice: Subject to any disclaimer, the term of this patent is extended or adjusted under 35 U.S.C. 154(b) by 137 days.

(21) Appl. No.: 14/949,451

(22) Filed: Nov. 23, 2015

(65) Prior Publication Data

US 2016/0149799 A1 May 26, 2016

(30) Foreign Application Priority Data

Nov. 25, 2014 (CN) .......................... 2014 1 0687509

(51) Int. Cl.
*H04L 12/705* (2013.01)
*H04L 12/721* (2013.01)
(Continued)

(52) U.S. Cl.
CPC .............. *H04L 45/18* (2013.01); *H04L 45/48* (2013.01); *H04L 45/66* (2013.01); *H04L 45/74* (2013.01);
(Continued)

(58) Field of Classification Search
CPC ..... H04L 41/0654; H04L 45/18; H04L 45/22; H04L 45/28; H04L 45/48; H04L 45/66; H04L 45/74
See application file for complete search history.

(56) References Cited

U.S. PATENT DOCUMENTS 6,798,739 B1* 9/2004 Lee .................. H04L 45/02
370/216
6,857,027 B1* 2/2005 Lindeborg .............. H04L 12/46
709/224
(Continued)

FOREIGN PATENT DOCUMENTS

CN 101707538 A 5/2010
CN 102055525 A 5/2011
EP 1675320 A1 6/2006

OTHER PUBLICATIONS

Foreign Communication From a Counterpart Application, European Application No. 15195025.0, Extended European Search Report dated Mar. 10, 2016, 8 pages.
(Continued)

*Primary Examiner* — Alpus Hsu
(74) *Attorney, Agent, or Firm* — Conley Rose, P.C.

(57) ABSTRACT

A loop avoidance method, device and system. The system includes a first network device and a second network device in an internal network, a first Ethernet port and a second Ethernet port of the two network devices are of a first type, and loop avoidance priorities of the Ethernet ports are different from each other; root media access control (MAC) addresses of the two network devices are the same, and are different from respective network bridge MAC addresses; the second network device receives a loop detection frame from the first Ethernet port through the second Ethernet port, where a source address of the loop detection frame is the root MAC address, and blocks the second Ethernet port according to the loop avoidance priority. A network device blocks, according to a loop avoidance priority, an Ethernet port connected to an external network to avoid changing a topology of an internal network.

20 Claims, 3 Drawing Sheets

(51) Int. Cl.
*H04L 12/741* (2013.01)
*G06F 11/00* (2006.01)
*H04L 12/753* (2013.01)
*H04L 29/06* (2006.01)

(52) U.S. Cl.
CPC ............ *H04L 45/745* (2013.01); *H04L 69/16* (2013.01); *H04L 69/22* (2013.01)

(56) References Cited

U.S. PATENT DOCUMENTS

| | | | | |
|---|---|---|---|---|
| 6,879,594 | B1* | 4/2005 | Lee | H04L 12/185 370/389 |
| 7,539,154 | B1* | 5/2009 | MacKay | H04L 12/462 370/216 |
| 7,558,205 | B1* | 7/2009 | Moncada-Elias | H04L 12/4625 370/236 |
| 7,688,756 | B2* | 3/2010 | Allan | H04L 12/462 370/254 |
| 7,706,258 | B2* | 4/2010 | Elie-Dit-Cosaque | H04L 45/00 370/222 |
| 7,822,049 | B1* | 10/2010 | Moncada-Elias | H04L 67/025 370/252 |
| 8,270,319 | B2* | 9/2012 | Casey | H04L 12/462 370/256 |
| 8,467,316 | B1* | 6/2013 | Goli | H04L 12/4625 370/254 |
| 8,509,618 | B2* | 8/2013 | Boertjes | H04J 14/0204 398/45 |
| 8,582,467 | B2* | 11/2013 | Hirota | H04L 12/4625 370/254 |
| 8,665,747 | B2* | 3/2014 | Elsen | H04L 12/462 370/254 |
| 9,007,958 | B2* | 4/2015 | Gupta | H04L 12/462 370/254 |
| 9,071,539 | B2* | 6/2015 | Zhou | H04L 12/4633 |
| 9,083,484 | B2* | 7/2015 | Boertjes | H04J 14/0204 |
| 9,137,137 | B2* | 9/2015 | Chen | H04L 43/10 |
| 9,143,447 | B2* | 9/2015 | Ogawa | H04L 43/10 |
| 9,178,799 | B2* | 11/2015 | Allan | H04L 45/16 |
| 9,178,819 | B2* | 11/2015 | Puneet | H04L 12/42 |
| 9,584,399 | B2* | 2/2017 | Wang | H04L 45/583 |
| 9,712,393 | B2* | 7/2017 | Ramesh | H04L 41/12 |
| 2005/0076140 | A1* | 4/2005 | Fung | H04L 12/4625 709/245 |
| 2006/0285499 | A1* | 12/2006 | Tzeng | H04L 45/18 370/249 |
| 2008/0130503 | A1* | 6/2008 | Kaempfer | H04L 45/00 370/235 |
| 2013/0003601 | A1 | 1/2013 | Gupta et al. | |
| 2014/0204768 | A1 | 7/2014 | Chen et al. | |
| 2016/0080120 | A1* | 3/2016 | Unger | H04L 12/462 370/249 |

OTHER PUBLICATIONS

Machine Translation and Abstract of Chinese Publication No. CN101707538, May 12, 2010, 15 pages.
Machine Translation and Abstract of Chinese Publication No. CN102055525, May 11, 2011, 6 pages.
Foreign Communication From a Counterpart Application, Chinese Application No. 201410687509.8, Chinese Office Action dated May 3, 2018, 6 pages.

* cited by examiner

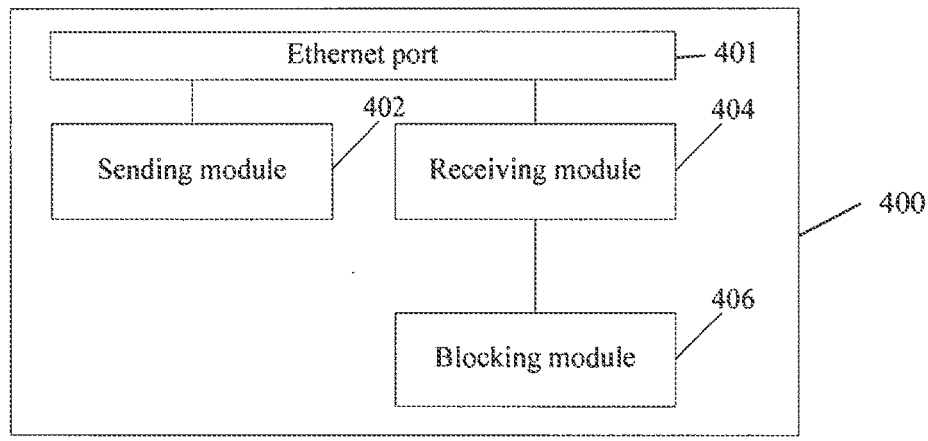
FIG. 4
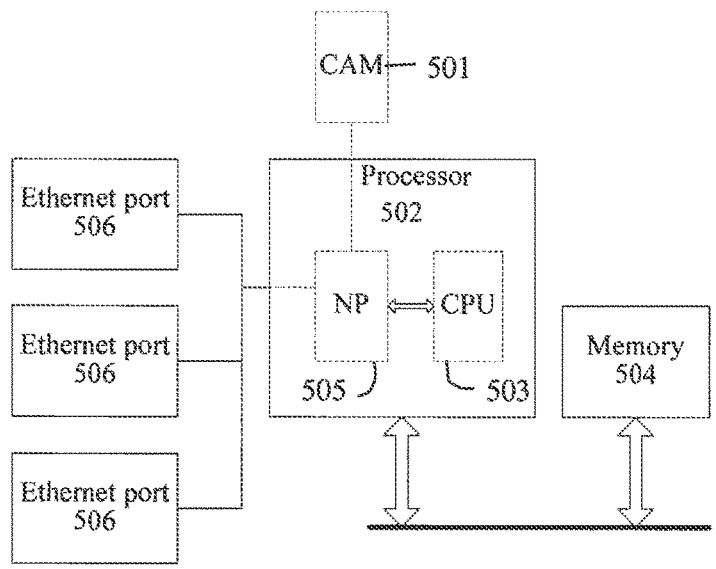
FIG. 5
| Destination MAC address | Source MAC address | Ether Type | Loop avoidance priority | FCS |
FIG. 6
| Destination MAC address | Source MAC address | LLDP Ether Type | LLDPDU | FCS |
FIG. 7

LOOP AVOIDANCE METHOD, DEVICE AND SYSTEM

CROSS-REFERENCE TO RELATED APPLICATION

This application claims priority to Chinese Patent Application No. 201410687509.8, filed on Nov. 25, 2014, which is hereby incorporated by reference in its entirety.

TECHNICAL FIELD

The present application relates to the communications field, and in particular, to a loop avoidance method, device and system.

BACKGROUND

A network switch is a computer networking device that connects devices together on a computer network, using packet switching to forward data to a destination device. The network switch is generally a media access control (MAC) bridge. The MAC bridge is a multi-port network bridge processing and forwarding data at a data link layer. A network switch in a data link layer network generally uses a Spanning Tree Protocol (STP) or Rapid Spanning Tree Protocol (RSTP) to ensure a loop-free topology for a bridged Ethernet local area network (LAN).

However, the STP or another type of loop breaking protocol does not distinguish an internal network used inside an organization and another external network. In this way, a situation in which an erroneous connection of the external network causes a topology of the internal network to change may exist.

SUMMARY

The present application provides a loop avoidance method, device and system, so as to resolve a problem that an erroneous connection of an external network causes a topology of an internal network to change.

According to a first aspect, a loop avoidance system is provided, including a first network device and a second network device, where the first network device and the second network device are both in an internal network, and the internal network is a network whose topology is ensured to be loop-free; a type of a first Ethernet port of the first network device is a first type, a loop avoidance priority of the first Ethernet port is a first loop avoidance priority, and a root MAC address of the first network device and a network bridge MAC address of the first network device are different; and a type of a second Ethernet port of the second network device is the first type, a loop avoidance priority of the second Ethernet port is a second loop avoidance priority, a root MAC address of the second network device and a network bridge MAC address of the second network device are different, and the root MAC address of the second network device is the same as the root MAC address of the first network device; where the first network device is configured to send a loop detection frame using the first Ethernet port, where the loop detection frame includes the first loop avoidance priority, and a source address of the loop detection frame is the root MAC address of the first network device; and the second network device is configured to receive the loop detection frame using the second Ethernet port, and block the second Ethernet port if the first loop avoidance priority is higher than the second loop avoidance priority, and the second network device is further configured to discard the loop detection frame.

With reference to the first aspect, in a first implementation of the first aspect, a type of a third Ethernet port of the first network device is a second type, the system further includes a third network device, the third network device is in the internal network, and a type of a fourth Ethernet port of the third network device is the second type; the first network device is further configured to send a first root negotiation frame using the third Ethernet port, and the first root negotiation frame includes the root MAC address of the first network device and a root priority of the first network device; and the third network device is configured to receive the first root negotiation frame using the fourth Ethernet port, and if the root priority of the first network device is higher than a root priority of the third network device, modify a root MAC address of the third network device into the root MAC address of the first network device and modifies the root priority of the third network device into the root priority of the first network device.

With reference to the first aspect or the first implementation of the first aspect, in a second implementation of the first aspect, a type of a fifth Ethernet port of the first network device is the first type, and the first network device is further configured to receive a third root negotiation frame using the fifth Ethernet port, and modify the type of the fifth Ethernet port into the second type.

With reference to any one of the first aspect, the first implementation of the first aspect and the second implementation of the first aspect, in a third implementation of the first aspect, a type of a sixth Ethernet port of the first network device is the second type, the system further includes a fourth network device, the fourth network device is in the internal network, and a type of a seventh Ethernet port of the fourth network device is the first type; the first network device is further configured to send a fourth root negotiation frame using the sixth Ethernet port, and the fourth root negotiation frame includes the root MAC address of the first network device and the root priority of the first network device; and the fourth network device is configured to receive the fourth root negotiation frame using the seventh Ethernet port, modify the type of the seventh Ethernet port into the second type, and if the root priority of the first network device is higher than a root priority of the fourth network device, the fourth network device modifies a root MAC address of the fourth network device into the root MAC address of the first network device and modifies the root priority of the fourth network device into the root priority of the first network device.

According to a second aspect, a loop avoidance method is provided, including sending, by a network device, a first loop detection frame using a first Ethernet port, where a type of the first Ethernet port is a first type, the first loop detection frame includes a first loop avoidance priority, the first loop avoidance priority is a loop avoidance priority of the first Ethernet port, a source address of the first loop detection frame is a root MAC address of the network device, and the root MAC address of the network device and a network bridge MAC address of the network device are different; receiving, by the network device, a second loop detection frame using a second Ethernet port, where a source address of the second loop detection frame is the root MAC address, the second loop detection frame includes a second loop avoidance priority, and a loop avoidance priority of the second Ethernet port is a third loop avoidance priority; if the second loop avoidance priority is higher than the third loop avoidance priority, blocking, by the network device, the second Ethernet port; and discarding, by the network device, the second loop detection frame.

With reference to the second aspect, in a first implementation of the second aspect, the method further includes sending, by the network device, a first root negotiation frame using a third Ethernet port, where the first root negotiation frame includes the root MAC address of the network device and a root priority of the network device, and a type of the third Ethernet port is a second type; receiving, by the network device, a second root negotiation frame using the third Ethernet port, where the second root negotiation frame includes a root MAC address of a network device that sends the second root negotiation frame and a root priority of the network device that sends the second root negotiation frame; and if the root priority of the network device that sends the second root negotiation frame is higher than the root priority of the network device, modifying, by the network device, the root MAC address of the network device into the root MAC address of the network device that sends the second root negotiation frame and modifying the root priority of the network device into the root priority of the network device that sends the second root negotiation frame.

With reference to the second aspect or the first implementation of the second aspect, in a second implementation of the second aspect, the method further includes receiving, by the network device, a third root negotiation frame using a fourth Ethernet port, where a type of the fourth Ethernet port is the first type; and modifying, by the network device, the type of the fourth Ethernet port into the second type.

With reference to any one of the second aspect, the first implementation of the second aspect and the second implementation of the second aspect, in a third implementation of the second aspect, the method further includes receiving, by the network device, a fourth root negotiation frame using a fifth Ethernet port, where the fourth root negotiation frame includes a root MAC address of a network device that sends the fourth root negotiation frame and a root priority of the network device that sends the fourth root negotiation frame, and a type of the fifth Ethernet port is the first type; modifying, by the network device, the type of the fifth Ethernet port into the second type; and if the root priority of the network device that sends the fourth root negotiation frame is higher than the root priority of the network device, modifying, by the network device, the root MAC address of the network device into the root MAC address of the network device that sends the fourth root negotiation frame and modifying the root priority of the network device into the root priority of the network device that sends the fourth root negotiation frame.

According to a third aspect, a loop avoidance device is provided, including a sending module, a receiving module and a blocking module, where the sending module is configured to send a first loop detection frame using a first Ethernet port of a network device, where a type of the first Ethernet port is a first type, the first loop detection frame includes a first loop avoidance priority, the first loop avoidance priority is a loop avoidance priority of the first Ethernet port, a source address of the first loop detection frame is a root MAC address of the network device, and the root MAC address of the network device and a network bridge MAC address of the network device are different; the receiving module is configured to receive a second loop detection frame using a second Ethernet port of the network device, where a source address of the second loop detection frame is the root MAC address, the second loop detection frame includes a second loop avoidance priority, and a loop avoidance priority of the second Ethernet port is a third loop avoidance priority, and further configured to discard the second loop detection frame; and if the second loop avoidance priority is higher than the third loop avoidance priority, the blocking module is configured to block the second Ethernet port.

With reference to the third aspect, in a first implementation of the third aspect, the device further includes a first modification module, where the sending module is further configured to send a first root negotiation frame using a third Ethernet port of the network device, and the first root negotiation frame includes the root MAC address of the network device and a root priority of the network device, and a type of the third Ethernet port is a second type; the receiving module is further configured to receive a second root negotiation frame using the third Ethernet port, where the second root negotiation frame includes a root MAC address of a network device that sends the second root negotiation frame and a root priority of the network device that sends the second root negotiation frame; and if the root priority of the network device that sends the second root negotiation frame is higher than the root priority of the network device, the first modification module is configured to modify the root MAC address of the network device into the root MAC address of the network device that sends the second root negotiation frame and modify the root priority of the network device into the root priority of the network device that sends the second root negotiation frame.

With reference to the third aspect or the first implementation of the third aspect, in a second implementation of the third aspect, the device further includes a second modification module, where the receiving module is further configured to receive a third root negotiation frame using a fourth Ethernet port of the network device, where a type of the fourth Ethernet port is the first type; and the second modification module is configured to modify the type of the fourth Ethernet port into the second type.

With reference to any one of the third aspect, the first implementation of the third aspect and the second implementation of the third aspect, in a third implementation of the third aspect, the device further includes a third modification module, where the receiving module is further configured to receive a fourth root negotiation frame using a fifth Ethernet port of the network device, where the fourth root negotiation frame includes a root MAC address of a network device that sends the fourth root negotiation frame and a root priority of the network device that sends the fourth root negotiation frame, and a type of the fifth Ethernet port is the first type; the third modification module is configured to modify the type of the fifth Ethernet port into the second type; and if the root priority of the network device that sends the fourth root negotiation frame is higher than the root priority of the network device, the third modification module is further configured to modify the root MAC address of the network device into the root MAC address of the network device that sends the fourth root negotiation frame and modify the root priority of the network device into the root priority of the network device that sends the fourth root negotiation frame.

According to a fourth aspect, a network device is provided, including a processor, a memory and multiple Ethernet ports, where the processor is connected to the memory, and the processor is connected to the multiple Ethernet ports, where the multiple Ethernet ports include a first Ethernet port and a second Ethernet port, a type of the first Ethernet port is a first type, a type of the second Ethernet port is the first type, a loop avoidance priority of the first Ethernet port is a first loop avoidance priority, and a loop avoidance priority of the second Ethernet port is a second loop avoidance priority; where the memory of the network device is configured to store a root MAC address of the network device, where the root MAC address of the network device and a network bridge MAC address of the network device are different; the processor is configured to send a first loop detection frame using the first Ethernet port, where the first loop detection frame includes the first loop avoidance priority, and a source address of the first loop detection frame is the root MAC address of the network device; the processor is further configured to receive a second loop detection frame using the second Ethernet port, where a source address of the second loop detection frame is the root MAC address, and the second loop detection frame includes a third loop avoidance priority; and the processor is further configured to compare the second loop avoidance priority with the third loop avoidance priority, and if the third loop avoidance priority is higher than the second loop avoidance priority, the processor blocks the second Ethernet port, and discards the second loop detection frame.

With reference to the fourth aspect, in a first implementation of the fourth aspect, the multiple Ethernet ports further include a third Ethernet port, and a type of the third Ethernet port is a second type; the processor sends a first root negotiation frame using the third Ethernet port, and the first root negotiation frame includes the root MAC address of the network device and a root priority of the network device; the processor receives a second root negotiation frame using the third Ethernet port, where the second root negotiation frame includes a root MAC address of a network device that sends the second root negotiation frame and a root priority of the network device that sends the second root negotiation frame; and if the root priority of the network device that sends the second root negotiation frame is higher than the root priority of the network device, the processor modifies the root MAC address of the network device into the root MAC address of the network device that sends the second root negotiation frame and modifies the root priority of the network device into the root priority of the network device that sends the second root negotiation frame.

With reference to the fourth aspect or the first implementation of the fourth aspect, in a second implementation of the fourth aspect, the network device further includes a fourth Ethernet port, and a type of the fourth Ethernet port is the first type; the processor receives a third root negotiation frame using the fourth Ethernet port; and the processor modifies the type of the fourth Ethernet port into the second type.

With reference to any one of the fourth aspect, the first implementation of the fourth aspect and the second implementation of the fourth aspect, in a third implementation of the fourth aspect, the network device further includes a fifth Ethernet port, and a type of the fifth Ethernet port is the first type; the processor receives a fourth root negotiation frame using the fifth Ethernet port, where the fourth root negotiation frame includes a root MAC address of a network device that sends the fourth root negotiation frame and a root priority of the network device that sends the fourth root negotiation frame; the processor modifies the type of the fifth Ethernet port into the second type; and if the root priority of the network device that sends the fourth root negotiation frame is higher than the root priority of the network device, the processor modifies the root MAC address of the network device into the root MAC address of the network device that sends the fourth root negotiation frame and modifies the root priority of the network device into the root priority of the network device that sends the fourth root negotiation frame.

Because a network device blocks, according to a loop avoidance priority, an Ethernet port whose type is a first type, that is, an Ethernet port connected to an external network, it is avoided to change a topology of an internal network.

BRIEF DESCRIPTION OF DRAWINGS

FIG. 4 is a functional diagram of a loop avoidance device according to an embodiment of the present invention; and FIG. 5 is a structural diagram of a network device according to an embodiment of the present disclosure.

FIG. 6 is a structural diagram of a loop detection frame according to an embodiment of the present invention;

FIG. 7 is a structural diagram of a root negotiation frame according to an embodiment of the present invention.

DESCRIPTION OF EMBODIMENTS

Embodiments of the present disclosure are described below with reference to FIG. 1 to FIG. 5.

Figure 1:
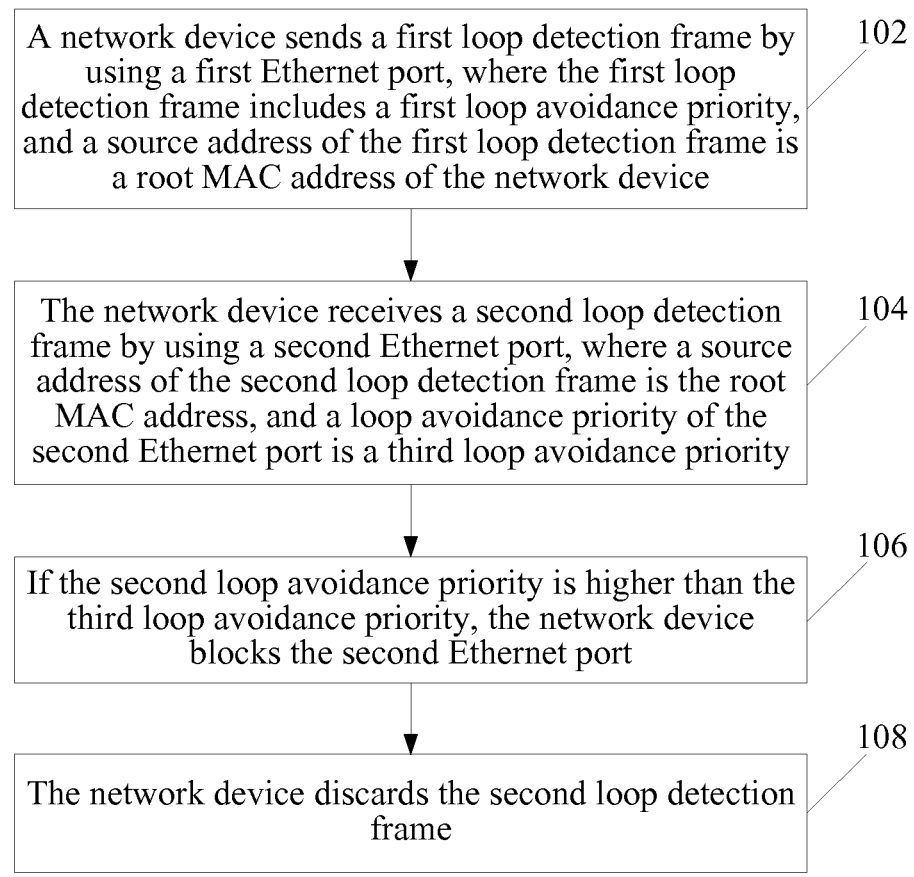
FIG. 1 is a flowchart of a loop avoidance method according to an embodiment of the present disclosure.

FIG. 1 is a flowchart of a loop avoidance method according to an embodiment of the present disclosure. The method includes the following steps.

102: A network device sends a first loop detection frame using a first Ethernet port, where a type of the first Ethernet port is a first type, the first loop detection frame includes a first loop avoidance priority, the first loop avoidance priority is a loop avoidance priority of the first Ethernet port, a source address of the first loop detection frame is a root MAC address of the network device, and the root MAC address of the network device and a network bridge MAC address of the network device are different.

The network device in this embodiment of the present disclosure is a network switch or another type of network device used as a MAC bridge. The network device has a MAC address specially used for detecting a loop, referred to as a root MAC address. To be distinguished from the root MAC address, a physical address of the network device is referred to as a network bridge MAC address. Ethernet ports of a network device are distinguished into two types: a first type and a second type. An Ethernet port whose type is the first type is an Ethernet port that may be connected to an external network. An Ethernet port whose type is the second type is an Ethernet port connected to another network device in an internal network. For example, in FIG. 2, types of an Ethernet port between a network device S1 and a network device S2, an Ethernet port between the network device S2 and a network device S4 and other Ethernet ports between network devices in an internal network, that is, the network device S1 to a network device S8, are the second type. Types of an Ethernet port between a network device S5 and a network device S9, and an Ethernet port between a network device S7 and the network device S9 are the first type. Which Ethernet ports of multiple Ethernet ports of a network device are of the second type may be preset according to a topology of an internal network, or may be dynamically set through negotiation. For an example of negotiating a type of an Ethernet port, refer to a scenario shown in FIG. 3.

The topology of the internal network is loop-free. It may be ensured that the internal network has no loop during physical connection, or some ports of network devices in the internal network may be blocked through pre-configuration to ensure that the internal network has no loop, or some ports of network devices in the internal network may be blocked by means of a loop breaking protocol to ensure that the internal network has no loop.

Multiple network devices in the internal network all use a same root MAC address to detect a loop. Network bridge MAC addresses of all network devices in the internal network are all different from the root MAC address; or, a network bridge MAC address of only one network device of all network devices in the internal network is the same as the root MAC address, and network bridge MAC addresses of all other network devices are all different from the root MAC address. For example, in FIG. 2, network devices in the internal network, that is, the network device S1 to the network device S8, have respective network bridge MAC addresses different from each other, but have a same root MAC address. A loop detection frame sent by each network device of the multiple network devices in the internal network uses the root MAC address as a source address. Root MAC addresses of all network devices in the internal network are the same, and if the external network forms a loop between two different network devices, these two network devices may receive a loop detection frame from each other, and a source address of the loop detection frame is the same as root MAC addresses of these two network devices, and therefore it may be determined simply and easily that a loop exists.

The root MAC addresses of all the network devices in the internal network may be preset to enable the root MAC addresses of all the network devices to be the same. Alternatively, a negotiation manner may be used to enable the root MAC addresses of all the network devices in the internal network to be the same. After negotiation is completed, the root MAC addresses of all the network devices in the internal network are root MAC addresses in the internal network whose initial root priorities are the highest. For an example of negotiating a root MAC address, refer to a scenario shown in FIG. 3.

A status of an Ethernet port of a network device may be up (UP), down (DOWN), blocked (Block) or the like. After an Ethernet port of a network device is connected to another network device using an Ethernet cable, a status of the Ethernet port is changed into UP.

All of the multiple network devices in the internal network send loop detection frames using respective Ethernet ports that are all in the UP state and of the first type. Optionally, if a status of an Ethernet port is changed into UP, a network device sends a loop detection frame using the Ethernet port. Alternatively, the network device may periodically send a loop detection frame using an Ethernet port whose status is UP.

As shown in FIG. 6, the loop detection frame may be a broadcast frame or may be a multicast frame. The loop detection frame has a specific format to indicate a purpose of the frame, that is, a frame specially used for detecting whether a loop exists in the external network. For example, a value of an EtherType field of a loop detection frame is a special value, and the special value is used to indicate that a broadcast frame or a multicast frame whose value of an EtherType field is the special value is a loop detection frame. For another example, a loop detection frame is a multicast frame, a destination address of the loop detection frame is a specific group MAC address, such as 01-80-C2-00-00-13, and the specific group MAC address is used to indicate that a multicast frame whose destination address is the specific group MAC address is a loop detection frame.

As shown in FIG. 6, the loop detection frame includes a loop avoidance priority field, and a value of the loop avoidance priority field is a loop avoidance priority of an Ethernet port that sends the loop detection frame. A source address of the loop detection frame is a root MAC address of a network device that sends the loop detection frame. Loop avoidance priorities of any two of all Ethernet ports of all the network devices in the internal network are different from each other.

For example, the type of the first Ethernet port is the first type, and the network device sends the first loop detection frame using the first Ethernet port. The first loop detection frame includes the loop avoidance priority of the first Ethernet port, that is, the first loop avoidance priority. The source address of the first loop detection frame is the root MAC address of the network device, and all network devices in the internal network in which the network device is located.

104: The network device receives a second loop detection frame using a second Ethernet port, where a source address of the second loop detection frame is the root MAC address, the second loop detection frame includes a second loop avoidance priority, and a loop avoidance priority of the second Ethernet port is a third loop avoidance priority.

The loop detection frame sent by the network device is a broadcast frame or a multicast frame, and therefore if an Ethernet port of the network device is connected to another Ethernet port of the network device using the external network, the other Ethernet port receives the loop detection frame. For example, in FIG. 2, an Ethernet port, of the network device S4, whose type is the first type is connected to another Ethernet port of the network device S4, and the other Ethernet port receives the loop detection frame. Alternatively, if an Ethernet port of the network device is connected to an Ethernet port of another network device in the internal network in which the network device is located, the Ethernet port of the other network device receives the loop detection frame, and the Ethernet port of the network device receives a loop detection frame sent by the Ethernet port, of the other network device, connected to the network device. The Ethernet port of the network device may be directly connected to another Ethernet port of the network device or an Ethernet port of another network device in the internal network in which the network device is located using an Ethernet cable. For example, in FIG. 2, an Ethernet port, of a network device S3, whose type is the first type sends a loop detection frame, the network device S8 receives the loop detection frame, and the Ethernet port of the network device S3 receives a loop detection frame sent by an Ethernet port, of the network device S8, connected to the network device S3. Alternatively, the Ethernet port of the network device may be connected to another Ethernet port of the network device or an Ethernet port of another network device in the internal network in which the network device is located using one or more network devices in the external network. For example, in FIG. 2, an Ethernet port, of the network device S5, whose type is the first type sends a loop detection frame, the network device S7 receives the loop detection frame using an Ethernet port connected to the network device S9 in the external network, and the network device S5 receives, using an Ethernet port connected to the network device S9 in the external network, a loop detection frame sent by the network device S7.

For example, the type of the second Ethernet port of the network device is the first type, and the loop avoidance priority of the second Ethernet port is the third loop avoidance priority. The network device is connected to another Ethernet port of the network device or an Ethernet port of another network device in the internal network in which the network device is located using the second Ethernet port. The network device receives the second loop detection frame using the second Ethernet port. The second loop detection frame is sent by the network device or another network device in the internal network in which the network device is located, and because a root MAC address of the other network device in the internal network in which the network device is located is the same as the root MAC address of the network device, the source address of the second loop detection frame is the root MAC address of the network device. The second loop detection frame includes the second loop avoidance priority. The second loop avoidance priority is a loop avoidance priority of an Ethernet port that sends the second loop detection frame. The loop avoidance priority of the first Ethernet port is the first loop avoidance priority.

106: If the second loop avoidance priority is higher than the third loop avoidance priority, the network device blocks the second Ethernet port.

The network device receives the second loop detection frame using the second Ethernet port, and on the other hand, because the type of the second Ethernet port is the first type, the Ethernet port that sends the second loop detection frame also receives a loop detection frame sent by the second Ethernet port. One of the second Ethernet port and the Ethernet port that sends the second loop detection frame is to be blocked. Which one of these two Ethernet ports is blocked is determined by loop avoidance priorities of these two Ethernet ports. The Ethernet port with a lower loop avoidance priority is blocked.

High and low loop avoidance priorities mentioned herein do not refer to magnitudes of values of the loop avoidance priorities, but refer to a sequence in which Ethernet ports with different loop avoidance priorities are blocked. For example, a totally-ordered set may be stipulated, and a loop avoidance priority of each Ethernet port in the internal network is an element in the totally-ordered set, and a totally-ordered relationship of the totally-ordered set is used to define any two loop avoidance priorities. For example, a loop avoidance priority is a positive integer, and a smaller one of the two loop avoidance priorities has a higher loop avoidance priority, or a larger one of the two loop avoidance priorities has a higher loop avoidance priority. For another example, a loop avoidance priority is a combination of a port priority of an Ethernet port of a network device and a network bridge MAC address of the network device. In the two loop avoidance priorities, a smaller network bridge MAC address value indicates a higher loop avoidance priority, or a larger network bridge MAC address value indicates a higher loop avoidance priority. If network bridge MAC addresses values are the same, a higher port priority of an Ethernet port indicates a higher loop avoidance priority in the two loop avoidance priorities. Network bridge MAC addresses of network devices are different from each other, and a single device may ensure that port priorities of Ethernet ports of the device are different from each other; therefore, it may be ensured that loop avoidance priorities of any two of all Ethernet ports of all network devices in the internal network are different from each other, and any two loop avoidance priorities may be compared.

After receiving the second loop detection frame using the second Ethernet port, the network device compares the second loop avoidance priority in the second loop detection frame with the third loop avoidance priority of the second Ethernet port, and determines, according to a comparison result, whether to block the second Ethernet port. If the second loop avoidance priority is higher than the third loop avoidance priority, the network device blocks the second Ethernet port. If the second loop avoidance priority is lower than the third loop avoidance priority, after the Ethernet port that sends the second loop detection frame receives the loop detection frame sent by the second Ethernet port, an Ethernet device that sends the second loop detection frame determines that the loop avoidance priority of the Ethernet port that sends the second loop detection frame is higher than the loop avoidance priority of the second Ethernet port, and the Ethernet device that sends the second loop detection frame blocks, according to the comparison result, the Ethernet port that sends the second loop detection frame.

108: The network device discards the second loop detection frame.

Although the second loop detection frame is a broadcast frame or a multicast frame, the network device does not forward the second loop detection frame. The network device does not forward any loop detection frame either, regardless of whether the source address of the loop detection frame is the root MAC address.

Because a network device blocks, according to a loop avoidance priority, an Ethernet port whose type is a first type, that is, an Ethernet port connected to an external network, it is avoided to change a topology of an internal network.

Figure 3:
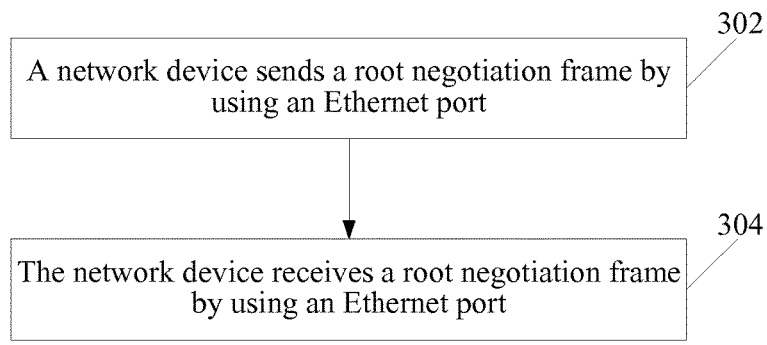
FIG. 3 is a flowchart of negotiation of an internal network in a scenario according to an embodiment of the present disclosure.

FIG. 3 is a flowchart of negotiation of an internal network in a scenario according to an embodiment of the present disclosure. The negotiation of the internal network includes two parts: negotiating a type of an Ethernet port and negotiating a root MAC address, and these two parts may be separately and independently implemented or may be jointly implemented. A method of the negotiation of the internal network includes the following steps.

302: A network device sends a root negotiation frame using an Ethernet port.

The root negotiation frame is a frame used to negotiate a type of an Ethernet port or negotiate a root MAC address between two network devices in an internal network. The root negotiation frame may be not only used to negotiate the type of the Ethernet port but also used to negotiate the root MAC address. The root negotiation frame may be a customized protocol data unit (PDU), or may be a PDU of an extended conventional protocol, such as a Link Layer Discovery Protocol data unit (LLDPDU) as shown in FIG. 7, A source MAC address of the root negotiation frame is a network bridge MAC address of a network device that sends the root negotiation frame. A destination MAC address of the root negotiation frame is a network bridge MAC address of a network device that receives the root negotiation frame, or a specific multicast address.

If the type of the Ethernet port is preset, a type of an Ethernet port, of multiple Ethernet ports of the network device, connected to another network device in the internal network in which the network device is located is already preset to a second type. In this case, a root MAC address needs to be negotiated. Therefore, the root negotiation frame sent by the network device includes a root MAC address of the network device and a root priority of the network device.

The root priority is used to determine a priority of the root MAC address. An initial root MAC address of the network device may be the same as the network bridge MAC address of the network device, or may be different from the network bridge MAC address of the network device. Root priorities of any two of all network devices in the internal network are different from each other. The network device sends the root negotiation frame using all Ethernet ports of the network device whose types are the second type. Because the type of the Ethernet port is preset according to a topology of the internal network, the network device receives, only using an Ethernet port of the network device whose type is the second type, a root negotiation frame sent by another network device. For example, the network device sends a first root negotiation frame using a third Ethernet port, where the first root negotiation frame includes the root MAC address of the network device and the root priority of the network device, and a type of the third Ethernet port is a second type.

If the root MAC address of the network device in the internal network is preset, root MAC addresses of all network devices in the internal network in which the network device is located are already preset to a same root MAC address. In this case, a type of an Ethernet port needs to be negotiated. The root negotiation frame sent by the network device may not include the root MAC address of the network device or the root priority of the network device. Some Ethernet ports in the network device are already designated as Ethernet ports specially used for connecting to other network devices in the internal network, that is, types of the some Ethernet ports in the network device are already designated as the second type. Types of other Ethernet ports in the network device are set to the first type by default. For example, a type of an uplink port in the network device is designated as the second type. Alternatively, types of one or more Ethernet ports, of the Ethernet ports in the network device, whose port identifier values are smallest or largest are designated as the second type. When the internal network is established, it is required that two Ethernet ports not specially used for connecting to other network devices in the internal network cannot be interconnected, or at least one of two connected Ethernet ports not specially used for connecting to other network devices in the internal network is in a blocked state. After the internal network is established, the network device sends the root negotiation frame using all Ethernet ports of the network device whose types are the second type. For example, the network device sends the first root negotiation frame using the third Ethernet port, where the type of the third Ethernet port is the second type.

If both the type of the Ethernet port and the root MAC address need to be negotiated, the root negotiation frame sent by the network device includes the root MAC address of the network device and the root priority of the network device. Some Ethernet ports in the network device are already designated as Ethernet ports specially used for connecting to other network devices in the internal network, that is, types of the some Ethernet ports in the network device are already designated as the second type. Types of other Ethernet ports in the network device are set to the first type by default. For example, a type of an uplink port in the network device is designated as the second type. After the internal network is established, the network device sends the root negotiation frame using all Ethernet ports of the network device whose types are the second type. For example, the network device sends a first root negotiation frame using the third Ethernet port, where the first root negotiation frame includes the root MAC address of the network device and the root priority of the network device, where the type of the third Ethernet port is the second type.

304: The network device receives a root negotiation frame using an Ethernet port.

If a type of an Ethernet port is preset, but a root MAC address needs to be negotiated, the root negotiation frame received by the network device includes a root MAC address of the network device and a root priority of the network device. Because the type of the Ethernet port is preset according to a topology of the internal network, the network device receives, only using an Ethernet port of the network device whose type is the second type, a root negotiation frame sent by another network device. If the root priority of the network device that sends the root negotiation frame is higher than the root priority of the network device, the network device modifies the root MAC address of the network device into the root MAC address of the network device that sends the root negotiation frame and modifies the root priority of the network device into the root priority of the network device that sends the root negotiation frame. If the root priority of the network device that sends the root negotiation frame is lower than the root priority of the network device, the network device does not need to modify the root MAC address or the root priority. High and low root priorities mentioned herein do not refer to magnitudes of values of the root priorities, but refer to a sequence in which root MAC addresses of different root priorities are designated as a unique root MAC address of the entire internal network. For example, a totally-ordered set may be stipulated, and a root priority of each network device in the internal network is an element in the totally-ordered set, and a totally-ordered relationship of the totally-ordered set is used to define any two root priorities. For example, a root priority is a positive integer, and a smaller one of the two root priorities has a higher root priority, or a larger one of the two root priorities has a higher root priority. For another example, a root priority is a value of a root MAC address, that is, in a root negotiation frame, it is not required that two fields separately carry the root MAC address and the root priority of the network device that sends the root negotiation frame, but it is only required that one field carries the root MAC address of the network device that sends the root negotiation frame, that is, the root priority of the network device. The smaller one in two root MAC addresses indicates a higher root priority, or the larger one of the two root MAC addresses indicates a higher root priority. Because a root MAC address itself is a root priority, modifying a root MAC address is equivalent to modifying a root priority, and if a root MAC address needs to be modified and a root priority needs to be modified, only the root MAC address needs to be modified, that is, it is equivalent to that the root MAC address is modified and the root priority is modified. For example, the network device receives a second root negotiation frame using the third Ethernet port, where the second root negotiation frame includes a root MAC address of a network device that sends the second root negotiation frame and a root priority of the network device that sends the second root negotiation frame. If the root priority of the network device that sends the second root negotiation frame is higher than the root priority of the network device, the network device modifies the root MAC address of the network device into the root MAC address of the network device that sends the second root negotiation frame and modifies the root priority of the network device into the root priority of the network device that sends the second root negotiation frame.

If the root MAC address of the network device in the internal network is preset, but the type of the Ethernet port needs to be negotiated, the root negotiation frame received by the network device may not include the root MAC address of the network device or the root priority of the network device. The type of the Ethernet port of the network device that receives the root negotiation frame may be the first type or may be the second type. If the type of the Ethernet port that receives the root negotiation frame is the second type, the network device does not need to further respond. If the type of the Ethernet port that receives the root negotiation frame is the first type, the network device modifies the type of the Ethernet port into the second type in response to receiving the root negotiation frame. For example, the network device receives a third root negotiation frame using a fourth Ethernet port, where a type of the fourth Ethernet port is the first type, and the network device modifies the type of the fourth Ethernet port into the second type.

If both the type of the Ethernet port and the root MAC address need to be negotiated, the root negotiation frame received by the network device includes the root MAC address of the network device and the root priority of the network device. The type of the Ethernet port of the network device that receives the root negotiation frame may be the first type or may be the second type. If the type of the Ethernet port that receives the root negotiation frame is the second type, the network device does not need to modify the type of the Ethernet port. If the type of the Ethernet port that receives the root negotiation frame is the first type, the network device modifies the type of the Ethernet port into the second type in response to receiving the root negotiation frame. If the root priority of the network device that sends the root negotiation frame is higher than the root priority of the network device, the network device modifies the root MAC address of the network device into the root MAC address of the network device that sends the root negotiation frame and modifies the root priority of the network device into the root priority of the network device that sends the root negotiation frame. If the root priority of the network device that sends the root negotiation frame is lower than the root priority of the network device, the network device does not need to modify the root MAC address or the root priority. For example, the network device receives a fourth root negotiation frame using a fifth Ethernet port, where the fourth root negotiation frame includes a root MAC address of a network device that sends the fourth root negotiation frame and a root priority of the network device that sends the fourth root negotiation frame, and a type of the fifth Ethernet port is the first type. The network device modifies the type of the fifth Ethernet port into the second type. If the root priority of the network device that sends the fourth root negotiation frame is higher than the root priority of the network device, the network device modifies the root MAC address of the network device into the root MAC address of the network device that sends the fourth root negotiation frame and modifies the root priority of the network device into the root priority of the network device that sends the fourth root negotiation frame.

Using the foregoing negotiation process, a root MAC address of a network device with the highest root priority in the internal network is gradually diffused into the entire internal network, and types of Ethernet ports, in the internal network, connected to the Ethernet ports specially used for connecting to other network devices in the internal network are all modified into the second type, thereby completing negotiation of types of Ethernet ports and root MAC addresses. If initial root MAC addresses of network devices in the internal network are the same as respective network bridge MAC addresses, after negotiation of the root MAC addresses is completed, multiple network devices in the internal network all use a same root MAC address, and a network bridge MAC address of only one network device of all the network devices in the internal network, that is, a network device with the highest root priority, is the same as the root MAC address, and network bridge MAC addresses of all other network devices are all different from the root MAC address. If the initial root MAC addresses of the network devices in the internal network are different from the respective network bridge MAC addresses, after negotiation of the root MAC addresses is completed, multiple network devices in the internal network all use a same root MAC address, and the network bridge MAC addresses of all the network devices in the internal network are all different from the root MAC address.

Figure 2:
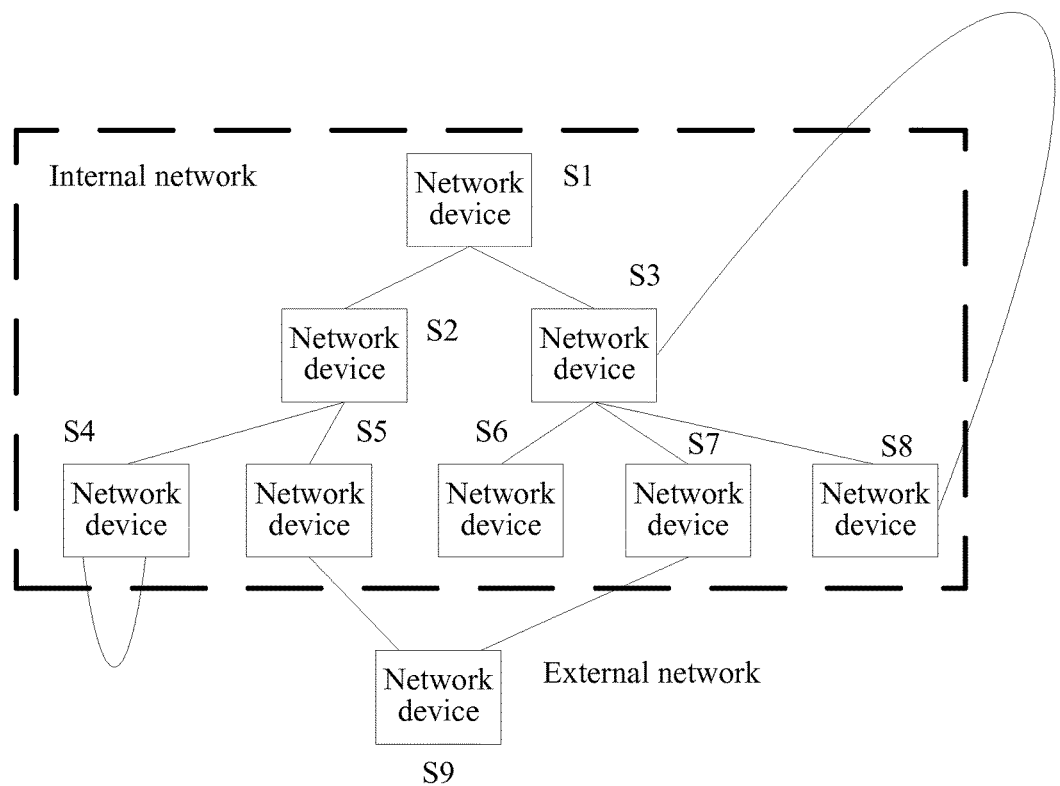
FIG. 2 is a schematic diagram of a loop avoidance system according to an embodiment of the present disclosure.

FIG. 2 is a schematic diagram of a loop avoidance system according to an embodiment of the present disclosure. The loop avoidance system includes multiple network devices, these multiple network devices are all in an internal network, and the internal network is a network whose topology is ensured to be loop-free. In FIG. 2, a network device S1 to a network device S8 are network devices in the internal network.

A network device in the internal network is a network switch or another type of network device used as a MAC bridge. The network device has a MAC address specially used for detecting a loop, referred to as a root MAC address. To be distinguished from the root MAC address, a physical address of the network device is referred to as a network bridge MAC address. Ethernet ports of a network device are distinguished into two types: a first type and a second type. An Ethernet port whose type is the first type is an Ethernet port that may be connected to an external network. An Ethernet port whose type is the second type is an Ethernet port connected to another network device in an internal network. For example, a type of an Ethernet port between the network device S1 to the network device S8 is the second type. Types of an Ethernet port between a network device S5 and a network device S9, and an Ethernet port between a network device S7 and the network device S9 are the first type. Which Ethernet ports of multiple Ethernet ports of each network device are of the second type may be preset according to a topology of an internal network, or may be dynamically set through negotiation. For an example of negotiating a type of an Ethernet port, refer to description elsewhere herein.

The topology of the internal network is loop-free. It may be ensured that the internal network has no loop during physical connection, or some ports of network devices in the internal network may be blocked through pre-configuration that the internal network has no loop, or some ports of network devices in the internal network may be blocked by means of a loop breaking protocol that the internal network has no loop.

Multiple network devices in the internal network all use a same root MAC address to detect a loop. Network bridge MAC addresses of all network devices in the internal network are all different from the root MAC address; or, a network bridge MAC address of only one network device of all network devices in the internal network is the same as the root MAC address, and network bridge MAC addresses of all other network devices are all different from the root MAC address. For example, the network device S1 to the network device S8, have respective network bridge MAC addresses different from each other, but have a same root MAC address. A loop detection frame sent by each network device of the multiple network devices in the internal network uses the root MAC address as a source address. Root MAC addresses of all network devices in the internal network are the same, and if the external network forms a loop between two different network devices, these two network devices may receive a loop detection frame from each other, and a source address of the loop detection frame is the same as root MAC addresses of these two network devices, and therefore it may be determined simply and easily that a loop exists.

The root MAC addresses of all the network devices in the internal network may be preset to enable the root MAC addresses of all the network devices to be the same. Alternatively, a negotiation manner may be used to enable the root MAC addresses of all the network devices in the internal network to be the same. After negotiation is completed, the root MAC addresses of all the network devices in the internal network are root MAC addresses in the internal network whose initial root priorities are the highest. For an example of negotiating a root MAC address, refer to description elsewhere herein.

A status of an Ethernet port of a network device may be up, down, blocked or the like. After an Ethernet port of a network device is connected to another network device using an Ethernet cable, a status of the Ethernet port is changed into UP.

All of the multiple network devices in the internal network send loop detection frames using respective Ethernet ports that are all in the UP state and of the first type. Optionally, if a state of an Ethernet port is changed into UP, a network device sends a loop detection frame using the Ethernet port. Alternatively, the network device may periodically send a loop detection frame using an Ethernet port whose status is UP.

The loop detection frame may be a broadcast frame or may be a multicast frame. The loop detection frame has a specific format to indicate a purpose of the frame, that is, a frame specially used for detecting whether a loop exists in the external network. For example, a value of an EtherType field of a loop detection frame is a special value, and the special value is used to indicate that a broadcast frame or a multicast frame whose value of an EtherType field is the special value is a loop detection frame. For another example, a loop detection frame is a multicast frame, a destination address of the loop detection frame is a specific group MAC address, such as 01-80-C2-00-00-13, and the specific group MAC address is used to indicate that a multicast frame whose destination address is the specific group MAC address is a loop detection frame.

The loop detection frame includes a loop avoidance priority field, and a value of the loop avoidance priority field is a loop avoidance priority of an Ethernet port that sends the loop detection frame. A source address of the loop detection frame is a root MAC address of a network device that sends the loop detection frame. Loop avoidance priorities of any two of all Ethernet ports of all the network devices in the internal network are different from each other.

That two network devices of the network device S1 to the network device S8 are a first network device and a second network device is used as an example, and both the first network device and the second network device are in the internal network. The first network device and the second network device may be any two network devices of the network device S1 to the network device S8.

A type of a first Ethernet port of the first network device is a first type, a loop avoidance priority of the first Ethernet port is a first loop avoidance priority, and a root MAC address of the first network device and a network bridge MAC address of the first network device are different.

A type of a second Ethernet port of the second network device is the first type, a loop avoidance priority of the second Ethernet port is a second loop avoidance priority, a root MAC address of the second network device and a network bridge MAC address of the second network device are different, and the root MAC address of the second network device and the root MAC address of the first network device are the same.

The first network device sends a first loop detection frame using the first Ethernet port. The first loop detection frame includes the first loop avoidance priority. A source address of the first loop detection frame is a root MAC address of the first network device, that is, a same root MAC address of all network devices in the internal network.

The loop detection frame sent by the first network device is a broadcast frame or a multicast frame, and therefore if the first Ethernet port is connected to the second Ethernet port of the second network device using the external network, the second network device receives the first loop detection frame using the second Ethernet port. The first Ethernet port may be directly connected to the second Ethernet port using an Ethernet cable. For example, in FIG. 2, an Ethernet port, of a network device S3, whose type is the first type sends a loop detection frame, the network device S8 receives the loop detection frame, and the Ethernet port of the network device S3 receives a loop detection frame sent by an Ethernet port, of the network device S8, connected to the network device S3. Alternatively, the first Ethernet port may be connected to the second Ethernet port using one or more network devices in the external network. For example, in FIG. 2, an Ethernet port, of the network device S5, whose type is the first type sends a loop detection frame, the network device S7 receives the loop detection frame using an Ethernet port connected to the network device S9 in the external network, and the network device S5 receives, using an Ethernet port connected to the network device S9 in the external network, a loop detection frame sent by the network device S7.

Because the type of the second Ethernet port is the first type, the first Ethernet port also receives the second loop detection frame sent by the second Ethernet port. One of the second Ethernet port and the first Ethernet port is to be blocked. Which one of these two Ethernet ports is blocked is determined by loop avoidance priorities of these two Ethernet ports. The Ethernet port with a lower loop avoidance priority is blocked.

High and low loop avoidance priorities mentioned herein do not refer to magnitudes of values of the loop avoidance priorities, but refer to a sequence in which Ethernet ports with different loop avoidance priorities are blocked. For example, a totally-ordered set may be stipulated, and a loop avoidance priority of each Ethernet port in the internal network is an element in the totally-ordered set, and a totally-ordered relationship of the totally-ordered set is used to define any two loop avoidance priorities. For example, a loop avoidance priority is a positive integer, and a smaller one of the two loop avoidance priorities has a higher loop avoidance priority, or a larger one of the two loop avoidance priorities has a higher loop avoidance priority. For another example, a loop avoidance priority is a combination of a port priority of an Ethernet port of a network device and a network bridge MAC address of the network device. In the two loop avoidance priorities, a smaller network bridge MAC address value indicates a higher loop avoidance priority, or a larger network bridge MAC address value indicates a higher loop avoidance priority. If network bridge MAC addresses values are the same, a higher port priority of an Ethernet port indicates a higher loop avoidance priority in the two loop avoidance priorities. Network bridge MAC addresses of network devices are different from each other, and a single device may ensure that port priorities of Ethernet ports of the device are different from each other; therefore, it may be ensured that loop avoidance priorities of any two of all Ethernet ports of all network devices in the internal network are different from each other, and any two loop avoidance priorities may be compared.

After receiving the first loop detection frame using the second Ethernet port, the second network device compares the first loop avoidance priority in the first loop detection frame with the second loop avoidance priority of the second Ethernet port, and determines, according to a comparison result, whether to block the second Ethernet port. If the first loop avoidance priority is higher than the second loop avoidance priority, the second network device blocks the second Ethernet port. If the first loop avoidance priority is lower than the second loop avoidance priority, after the first Ethernet port of the first network device receives the second loop detection frame sent by the second Ethernet port, the first network device determines that the loop avoidance priority of the second Ethernet port is higher than the loop avoidance priority of the first Ethernet port, and the first network device blocks the first Ethernet port according to the comparison result.

Although the first loop detection frame is a broadcast frame or a multicast frame, the second network device does not forward the first loop detection frame. The second network device discards the first loop detection frame. The network device in the internal network does not forward any loop detection frame either, regardless of whether the source address of the loop detection frame is the root MAC address.

In the loop avoidance system, root MAC addresses of all network devices in the internal network are the same, and if the external network forms a loop between the first network device and the second network device, these two network devices may receive a loop detection frame from each other, and a source address of the loop detection frame is the same as root MAC addresses of these two network devices, and therefore it may be determined simply and easily that a loop exists, and an Ethernet port connected to the external network is blocked according to a loop avoidance priority, to avoid change of a topology of the internal network.

Negotiation of an internal network in a scenario of an embodiment of the present disclosure is described above with reference to FIG. 3. The negotiation of the internal network includes two parts: negotiating a type of an Ethernet port and negotiating a root MAC address, and these two parts may be separately and independently implemented or may be jointly implemented.

In the scenario, negotiation is completed between multiple network devices in the internal network using a root negotiation frame. The root negotiation frame is a frame used to negotiate a type of an Ethernet port or negotiate a root MAC address between any two network devices of the multiple network devices. The root negotiation frame may be not only used to negotiate the type of the Ethernet port but also used to negotiate the root MAC address. The root negotiation frame may be a customized PDU, or may be a PDU of an extended conventional protocol, such as an LLDPDU. A source MAC address of the root negotiation frame is a network bridge MAC address of a network device that sends the root negotiation frame. A destination MAC address of the root negotiation frame is a network bridge MAC address of a network device that receives the root negotiation frame, or a specific multicast address.

If the type of the Ethernet port is preset, a type of an Ethernet port, of multiple Ethernet ports of the network device, connected to another network device in the internal network in which the network device is located is already preset to a second type. In this case, a root MAC address needs to be negotiated. Therefore, the root negotiation frame sent by the network device includes a root MAC address of the network device and a root priority of the network device. The root priority is used to determine a priority of the root MAC address. An initial root MAC address of the network device may be the same as the network bridge MAC address of the network device, or may be different from the network bridge MAC address of the network device. Root priorities of any two of all network devices in the internal network are different from each other. The network device sends the root negotiation frame using all Ethernet ports of the network device whose types are the second type. Because the type of the Ethernet port is preset according to a topology of the internal network, the network device receives, only using an Ethernet port of the network device whose type is the second type, a root negotiation frame sent by another network device. For example, the first network device sends a first root negotiation frame using a third Ethernet port, where the first root negotiation frame includes the root MAC address of the network device and the root priority of the network device, and a type of the third Ethernet port is a second type.

A third network device in the internal network receives the first root negotiation frame using a fourth Ethernet port. Because the type of the Ethernet port is preset according to a topology of the internal network, the third network device receives, only using an Ethernet port whose type is the second type, a root negotiation frame sent by another network device. If the root priority of the first network device is higher than the root priority of the third network device, the third network device modifies the root MAC address of the network device into the root MAC address of the first network device and modifies the root priority of the third network device into the root priority of the first network device. If the root priority of the first network device is lower than the root priority of the third network device, the third network device does not need to modify the root MAC address or the root priority. For example, the network device S2 receives a first root negotiation frame sent by the network device S1, the first root negotiation frame includes a root MAC address of the network device S1 and a root priority of the network device S1, the root priority of the network device S1 is higher than a root priority of the network device S2, the network device S2 modifies a root MAC address of the network device S2 into the root MAC address of the network device S1 and modifies the root priority of the network device S2 into the root priority of the network device S1.

High and low root priorities mentioned herein do not refer to magnitudes of values of the root priorities, but refer to a sequence in which root MAC addresses of different root priorities are designated as a unique root MAC address of the entire internal network. For example, a totally-ordered set may be stipulated, and a root priority of each network device in the internal network is an element in the totally-ordered set, and a totally-ordered relationship of the totally-ordered set is used to define any two root priorities. For example, a root priority is a positive integer, and a smaller one of the two root priorities has a higher root priority, or a larger one of the two root priorities has a higher root priority. For another example, a root priority is a value of a root MAC address, that is, in a root negotiation frame, it is not required that two fields separately carry the root MAC address and the root priority of the network device that sends the root negotiation frame, but it is only required that one field carries the root MAC address of the network device that sends the root negotiation frame, that is, the root priority of the network device. The smaller one in two root MAC addresses indicates a higher root priority, or the larger one of the two root MAC addresses indicates a higher root priority. Because a root MAC address itself is a root priority, modifying a root MAC address is equivalent to modifying a root priority, and if a root MAC address needs to be modified and a root priority needs to be modified, only the root MAC address needs to be modified, that is, it is equivalent to that the root MAC address is modified and the root priority is modified.

If the root MAC address of the network device in the internal network is preset, root MAC addresses of all network devices in the internal network in which the network device is located are already preset to a same root MAC address. In this case, a type of an Ethernet port needs to be negotiated. The root negotiation frame sent by the network device may not include the root MAC address of the network device or the root priority of the network device. Some Ethernet ports in the network device are already designated as Ethernet ports specially used for connecting to other network devices in the internal network, that is, types of the some Ethernet ports in the network device are already designated as the second type. Types of other Ethernet ports in the network device are set to the first type by default. For example, a type of an uplink port in the network device is designated as the second type. Alternatively, types of one or more Ethernet ports, of the Ethernet ports in the network device, whose port identifier values are smallest or largest are designated as the second type. When the internal network is established, it is required that two Ethernet ports not specially used for connecting to other network devices in the internal network cannot be interconnected, or at least one of two connected Ethernet ports not specially used for connecting to other network devices in the internal network is in a blocked state. For example, in FIG. 2, uplink ports of the network device S1 to the network device S8 are designated as Ethernet ports specially used for connecting to other network devices in the internal network. Uplink ports of the network device S2 and the network device S3 are connected to the network device S1, uplink ports of the network device S4 and the network device S5 are connected to the network device S2, and uplink ports of the network device S6, the network device S7 and the network device S8 are connected to the network device S3. After the internal network is established, the network device sends the root negotiation frame using all Ethernet ports of the network device whose types are the second type.

The type of the Ethernet port of the network device that receives the root negotiation frame may be the first type or may be the second type. If the type of the Ethernet port that receives the root negotiation frame is the second type, the network device does not need to further respond. If the type of the Ethernet port that receives the root negotiation frame is the first type, the network device modifies the type of the Ethernet port into the second type in response to receiving the root negotiation frame. For example, a type of a fifth Ethernet port of the first network device is the first type, and the first network device receives a third root negotiation frame using the fifth Ethernet port, and modifies the type of the fifth Ethernet port into the second type. For example, the uplink port of the network device S4 is connected to the network device S2, the network device S2 receives a third root negotiation frame using an Ethernet port connected to the network device S4, and in response to receiving the third root negotiation frame, the network device S2 modifies a type of the Ethernet port connected to the network device S4 into the second type.

If both the type of the Ethernet port and the root MAC address need to be negotiated, the root negotiation frame sent by the network device includes the root MAC address of the network device and the root priority of the network device. Some Ethernet ports in the network device are already designated as Ethernet ports specially used for connecting to other network devices in the internal network, that is, types of the some Ethernet ports in the network device are already designated as the second type. Types of other Ethernet ports in the network device are set to the first type by default. For example, a type of an uplink port in the network device is designated as the second type. After the internal network is established, the network device sends the root negotiation frame using all Ethernet ports of the network device whose types are the second type. For example, a type of a sixth Ethernet port of the first network device is the second type, the first network device sends a fourth root negotiation frame using the sixth Ethernet port, and the fourth root negotiation frame includes the root MAC address of the first network device and the root priority of the first network device. For example, the uplink port of the network device S5 is connected to the network device S2, the network device S5 sends a fourth root negotiation frame using the uplink port, and the fourth root negotiation frame includes a root MAC address of the network device S5 and a root priority of the network device S5.

The type of the Ethernet port, of the network device, that receives the root negotiation frame may be the first type or may be the second type. If the type of the Ethernet port that receives the root negotiation frame is the second type, the network device does not need to modify the type of the Ethernet port. If the root priority of the network device that sends the root negotiation frame is higher than the root priority of the network device, the network device modifies the root MAC address of the network device into the root MAC address of the network device that sends the root negotiation frame and modifies the root priority of the network device into the root priority of the network device that sends the root negotiation frame. If the root priority of the network device that sends the root negotiation frame is lower than the root priority of the network device, the network device does not need to modify the root MAC address or the root priority. For example, a fourth network device in the internal network receives the fourth root negotiation frame using a seventh Ethernet port, and a type of the seventh Ethernet port is the first type. The fourth network device modifies the type of the seventh Ethernet port into the second type. If the root priority of the first network device is higher than the root priority of the fourth network device, the fourth network device modifies the root MAC address of the fourth network device into the root MAC address of the first network device and modifies the root priority of the fourth network device into the root priority of the first network device. For example, the network device S2 receives a fourth root negotiation frame using an Ethernet port connected to the network device S5, and in response to receiving the fourth root negotiation frame, the network device S2 modifies a type of the Ethernet port connected to the network device S5 into the second type. A root priority of the network device S5 is higher than the root priority of the network device S2, the network device S2 modifies the root MAC address of the network device S2 into a root MAC address of the network device S5 and modifies the root priority of the network device S2 into the root priority of the network device S5.

FIG. 4 is a functional diagram of a loop avoidance device according to an embodiment of the present invention. The loop avoidance device is implemented by a network device 400 shown as a big box in FIG. 4. The network device 400 is a network switch or another type of network device 400 used as a MAC bridge. The network device 400 has a MAC address specially used for detecting a loop, referred to as a root MAC address. To be distinguished from the root MAC address, a physical address of the network device 400 is referred to as a network bridge MAC address, Ethernet ports 401 of a network device 400 are distinguished into two types: a first type and a second type. An Ethernet port 401 whose type is the first type is an Ethernet port that may be connected to an external network. An Ethernet port 401 whose type is the second type is an Ethernet port connected to another network device in an internal network. Which Ethernet ports of multiple Ethernet ports 401 of a network device 400 are of the second type may be preset according to a topology of an internal network, or may be dynamically set through negotiation between the loop avoidance device and another network device 400. For a specific example of negotiating a type of an Ethernet port 401, refer to description in a subsequent scenario.

The network device 400 also includes a sending module 402, a receiving module 404 and a blocking module 406. The sending module 402, the receiving module 404 and the blocking module 406 may be implemented in a processor (e.g. processor 502).

The sending module 402 is configured to send a first loop detection frame using a first Ethernet port of the network device, where a type of the first Ethernet port is a first type, the first loop detection frame includes a first loop avoidance priority, the first loop avoidance priority is a loop avoidance priority of the first Ethernet port, a source address of the first loop detection frame is a root MAC address of the network device, and the root MAC address of the network device and a network bridge MAC address of the network device are different.

The topology of the internal network is loop-free. It may be ensured that the internal network has no loop during physical connection, or it some ports of network devices in the internal network may be blocked through pre-configuration that the internal network has no loop, or some ports of network devices in the internal network may be blocked by means of a loop breaking protocol that the internal network has no loop.

Multiple network devices in the internal network all use a same root MAC address to detect a loop. Network bridge MAC addresses of all network devices in the internal network are all different from the root MAC address; or, a network bridge MAC address of only one network device of all network devices in the internal network is the same as the root MAC address, and network bridge MAC addresses of all other network devices are all different from the root MAC address. A loop detection frame sent by each network device of the multiple network devices in the internal network uses the root MAC address as a source address. Root MAC addresses of all network devices in the internal network are the same, and if the external network forms a loop between two different network devices, these two network devices may receive a loop detection frame from each other, and a source address of the loop detection frame is the same as root MAC addresses of these two network devices, and therefore it may be determined simply and easily that a loop exists.

The root MAC addresses of all the network devices in the internal network may be preset to enable the root MAC addresses of all the network devices to be the same. Alternatively, a negotiation manner may be used to enable the root MAC addresses of all the network devices in the internal network to be the same. After negotiation is completed, the root MAC addresses of all the network devices in the internal network are root MAC addresses in the internal network whose initial root priorities are the highest. For an example of negotiating a root MAC address, refer to description elsewhere herein.

A status of an Ethernet port of a network device may be up, down, blocked or the like. After an Ethernet port of a network device is connected to another network device using an Ethernet cable, a status of the Ethernet port is changed into UP.

Sending modules 402 of loop avoidance devices of all of the multiple network devices in the internal network send loop detection frames using respective Ethernet ports that are all in the UP state and of the first type. Optionally, if a status of an Ethernet port is changed into UP, the sending module 402 sends a loop detection frame using the Ethernet port. Alternatively, the sending module 402 may periodically send a loop detection frame using an Ethernet port whose status is UP.

The loop detection frame may be a broadcast frame or may be a multicast frame. The loop detection frame has a specific format to indicate a purpose of the frame, that is, a frame specially used for detecting whether a loop exists in the external network. For example, a value of an EtherType field of a loop detection frame is a special value, and the special value is used to indicate that a broadcast frame or a multicast frame whose value of an EtherType field is the special value is a loop detection frame. For another example, a loop detection frame is a multicast frame, a destination address of the loop detection frame is a specific group MAC address, such as 01-80-C2-00-00-13, and the specific group MAC address is used to indicate that a multicast frame whose destination address is the specific group MAC address is a loop detection frame.

The loop detection frame includes a loop avoidance priority field, and a value of the loop avoidance priority field is a loop avoidance priority of an Ethernet port that sends the loop detection frame. A source address of the loop detection frame is a root MAC address of a network device that sends the loop detection frame and in which the loop avoidance device is located. Loop avoidance priorities of any two of all Ethernet ports of all the network devices in the internal network are different from each other.

For example, the type of the first Ethernet port is the first type, and the sending module 402 sends the first loop detection frame using the first Ethernet port. The first loop detection frame includes the loop avoidance priority of the first Ethernet port, that is, the first loop avoidance priority. The source address of the first loop detection frame is the root MAC address of the network device in which the loop avoidance device is located, and all network devices in the internal network in which the network device is located.

The receiving module 404 is configured to receive a second loop detection frame using a second Ethernet port of the network device, where a source address of the second loop detection frame is the root MAC address, the second loop detection frame includes a second loop avoidance priority, and a loop avoidance priority of the second Ethernet port is a third loop avoidance priority, and further configured to discard the second loop detection frame.

The loop detection frame sent by the sending module 402 of the network device is a broadcast frame or a multicast frame, and therefore if an Ethernet port of the network device is connected to another Ethernet port of the network device using the external network, the other Ethernet port receives the loop detection frame. Alternatively, if an Ethernet port of the network device is connected to an Ethernet port of another network device in the internal network in which the network device is located, the Ethernet port of the other network device receives the loop detection frame, and the Ethernet port of the network device receives a loop detection frame sent by the Ethernet port, of the other network device, connected to the network device. The Ethernet port of the network device may be directly connected to another Ethernet port of the network device or an Ethernet port of another network device in the internal network in which the network device is located using an Ethernet cable. Alternatively, the Ethernet port of the network device may be connected to another Ethernet port of the network device or an Ethernet port of another network device in the internal network in which the network device is located using one or more network devices in the external network.

For example, the type of the second Ethernet port of the network device is the first type, and the loop avoidance priority of the second Ethernet port is the third loop avoidance priority. The network device is connected to another Ethernet port of the network device or an Ethernet port of another network device in the internal network in which the network device is located using the second Ethernet port. The receiving module 404 of the network device receives the second loop detection frame using the second Ethernet port. The second loop detection frame is sent by the network device or another network device in the internal network in which the network device is located, and because a root MAC address of the other network device in the internal network in which the network device is located is the same as the root MAC address of the network device, the source address of the second loop detection frame is the root MAC address of the network device. The second loop detection frame includes the second loop avoidance priority. The second loop avoidance priority is a loop avoidance priority of an Ethernet port that sends the second loop detection frame. The loop avoidance priority of the first Ethernet port is the first loop avoidance priority. Although the second loop detection frame is a broadcast frame or a multicast frame, the network device does not forward the second loop detection frame, and therefore, the receiving module 404 discards the second loop detection frame. The loop avoidance device does not forward any loop detection frame either, regardless of whether the source address thereof is a root MAC address.

If the second loop avoidance priority is higher than the third loop avoidance priority, the blocking module 406 is configured to block the second Ethernet port.

The receiving module 404 of the network device receives the second loop detection frame using the second Ethernet port, and on the other hand, because the type of the second Ethernet port is the first type, the Ethernet port that sends the second loop detection frame also receives a loop detection frame sent by the second Ethernet port. One of the second Ethernet port and the Ethernet port that sends the second loop detection frame is to be blocked. Which one of these two Ethernet ports is blocked is determined by loop avoidance priorities of these two Ethernet ports. The Ethernet port with a lower loop avoidance priority is blocked.

High and low loop avoidance priorities mentioned herein do not refer to magnitudes of values of the loop avoidance priorities, but refer to a sequence in which Ethernet ports with different loop avoidance priorities are blocked. For example, a totally-ordered set may be stipulated, and a loop avoidance priority of each Ethernet port in the internal network is an element in the totally-ordered set, and a totally-ordered relationship of the totally-ordered set is used to define any two loop avoidance priorities. For example, a loop avoidance priority is a positive integer, and a smaller one of the two loop avoidance priorities has a higher loop avoidance priority, or a larger one of the two loop avoidance priorities has a higher loop avoidance priority. For another example, a loop avoidance priority is a combination of a port priority of an Ethernet port of a network device and a network bridge MAC address of the network device. In the two loop avoidance priorities, a smaller network bridge MAC address value indicates a higher loop avoidance priority, or a larger network bridge MAC address value indicates a higher loop avoidance priority. If network bridge MAC addresses values are the same, a higher port priority of an Ethernet port indicates a higher loop avoidance priority in the two loop avoidance priorities. Network bridge MAC addresses of network devices are different from each other, and a single device may ensure that port priorities of Ethernet ports of the device are different from each other; therefore, it may be ensured that loop avoidance priorities of any two of all Ethernet ports of all network devices in the internal network are different from each other, and any two loop avoidance priorities may be compared.

After the receiving module 404 of the network device receives the second loop detection frame using the second Ethernet port, the blocking module 406 of the network device compares the second loop avoidance priority in the second loop detection frame with the third loop avoidance priority of the second Ethernet port, and determines, according to a comparison result, whether to block the second Ethernet port. If the second loop avoidance priority is higher than the third loop avoidance priority, the blocking module 406 blocks the second Ethernet port.

Because a loop avoidance device blocks, according to a loop avoidance priority, an Ethernet port whose type is a first type, that is, an Ethernet port connected to an external network, it is avoided to change a topology of an internal network.

A scenario of negotiation of an internal network is described below. The negotiation of the internal network includes two parts: negotiating a type of an Ethernet port and negotiating a root MAC address, and these two parts may be separately and independently implemented and may also be jointly implemented.

In the scenario of negotiation of the internal network, the sending module 402 is further configured to send a root negotiation frame, and the receiving module 404 is further configured to receive the root negotiation frame. The root negotiation frame is a frame used to negotiate a type of an Ethernet port or negotiate a root MAC address between two network devices in an internal network. The root negotiation frame may be not only used to negotiate the type of the Ethernet port but also used to negotiate the root MAC address. The root negotiation frame may be a customized PDU, or may be a PDU of an extended conventional protocol, such as an LLDPDU. A source MAC address of the root negotiation frame is a network bridge MAC address of a network device that sends the root negotiation frame. A destination MAC address of the root negotiation frame is a network bridge MAC address of a network device that receives the root negotiation frame, or a specific multicast address.

If the type of the Ethernet port is preset, a type of an Ethernet port, of multiple Ethernet ports of the network device, connected to another network device in the internal network in which the network device is located is already preset to a second type. In this case, a root MAC address needs to be negotiated, and the loop avoidance device further includes a first modification module. The root negotiation frame sent by the sending module 402 of the network device includes the root MAC address of the network device and the root priority of the network device. The root priority is used to determine a priority of the root MAC address. An initial root MAC address of the network device may be the same as the network bridge MAC address of the network device, or may be different from the network bridge MAC address of the network device. Root priorities of any two of all network devices in the internal network are different from each other. The network device sends the root negotiation frame using all Ethernet ports of the network device whose types are the second type. Because the type of the Ethernet port is preset according to a topology of the internal network, the receiving module 404 receives, only using an Ethernet port, of the network device, whose type is the second type, a root negotiation frame sent by another network device. For example, the sending module 402 is further configured to send a first root negotiation frame using a third Ethernet port of the network device, and the first root negotiation frame includes the root MAC address of the network device and a root priority of the network device, and a type of the third Ethernet port is a second type.

Because the type of the Ethernet port is preset according to a topology of the internal network, the receiving module 404 of the network device receives, only using an Ethernet port of the network device whose type is the second type, a root negotiation frame sent by another network device. If the root priority of the network device that sends the root negotiation frame is higher than the root priority of the network device, the first modification module of the network device modifies the root MAC address of the network device into the root MAC address of the network device that sends the root negotiation frame and modifies the root priority of the network device into the root priority of the network device that sends the root negotiation frame. If the root priority of the network device that sends the root negotiation frame is lower than the root priority of the network device, the first modification module of the network device does not need to modify the root MAC address or the root priority. High and low root priorities mentioned herein do not refer to magnitudes of values of the root priorities, but refer to a sequence in which root MAC addresses of different root priorities are designated as a unique root MAC address of the entire internal network. For example, a totally-ordered set may be stipulated, and a root priority of each network device in the internal network is an element in the totally-ordered set, and a totally-ordered relationship of the totally-ordered set is used to define any two root priorities. For example, a root priority is a positive integer, and a smaller one of the two root priorities has a higher root priority, or a larger one of the two root priorities has a higher root priority. For another example, a root priority is a value of a root MAC address, that is, in a root negotiation frame, it is not required that two fields separately carry the root MAC address and the root priority of the network device that sends the root negotiation frame, but it is only required that one field carries the root MAC address of the network device that sends the root negotiation frame, that is, the root priority of the network device. The smaller one in two root MAC addresses indicates a higher root priority, or the larger one of the two root MAC addresses indicates a higher root priority. Because a root MAC address itself is a root priority, modifying a root MAC address is equivalent to modifying a root priority, and if a root MAC address needs to be modified and a root priority needs to be modified, only the root MAC address needs to be modified, that is, it is equivalent to that the root MAC address is modified and the root priority is modified. For example, the receiving module 404 is further configured to receive a second root negotiation frame using the third Ethernet port, where the second root negotiation frame includes a root MAC address of a network device that sends the second root negotiation frame and a root priority of the network device that sends the second root negotiation frame. If the root priority of the network device that sends the second root negotiation frame is higher than the root priority of the network device, the first modification module is configured to modify the root MAC address of the network device into the root MAC address of the network device that sends the second root negotiation frame and modify the root priority of the network device into the root priority of the network device that sends the second root negotiation frame.

If the root MAC address of the network device in the internal network is preset, root MAC addresses of all network devices in the internal network in which the network device is located are already preset to a same root MAC address. In this case, a type of an Ethernet port needs to be negotiated. The loop avoidance device further includes a second modification module. The root negotiation frame may not include the root MAC address of the network device or the root priority of the network device. Some Ethernet ports in the network device are already designated as Ethernet ports specially used for connecting to other network devices in the internal network, that is, types of the some Ethernet ports in the network device are already designated as the second type. Types of other Ethernet ports in the network device are set to the first type by default. For example, a type of an uplink port in the network device is designated as the second type. Alternatively, types of one or more Ethernet ports, of the Ethernet ports in the network device, whose port identifier values are smallest or largest are designated as the second type. When the internal network is established, it is required that two Ethernet ports not specially used for connecting to other network devices in the internal network cannot be interconnected, or at least one of two connected Ethernet ports not specially used for connecting to other network devices in the internal network is in a blocked state. After the internal network is established, the sending module 402 of the network device sends the root negotiation frame using all Ethernet ports of the network device whose types are the second type. For example, the sending module 402 sends the first root negotiation frame using the third Ethernet port, where the type of the third Ethernet port is the second type.

The type of the Ethernet port of the network device that receives the root negotiation frame may be the first type or may be the second type. If the type of the Ethernet port that receives the root negotiation frame is the second type, the network device does not need to further respond. If the type of the Ethernet port that receives the root negotiation frame is the first type, the second modification module of the network device modifies the type of the Ethernet port into the second type in response to receiving the root negotiation frame. For example, the receiving module 404 is further configured to receive a third root negotiation frame using a fourth Ethernet port of the network device, where a type of the fourth Ethernet port is the first type. The second modification module is configured to modify the type of the fourth Ethernet port into the second type.

If both the type of the Ethernet port and the root MAC address need to be negotiated, the root negotiation frame sent by the sending module 402 of the network device includes the root MAC address of the network device and the root priority of the network device. Some Ethernet ports in the network device are already designated as Ethernet ports specially used for connecting to other network devices in the internal network, that is, types of the some Ethernet ports in the network device are already designated as the second type. Types of other Ethernet ports in the network device are set to the first type by default. For example, a type of an uplink port in the network device is designated as the second type. After the internal network is established, the network device sends the root negotiation frame using all Ethernet ports of the network device whose types are the second type. For example, the network device sends a first root negotiation frame using the third Ethernet port, where the first root negotiation frame includes the root MAC address of the network device and the root priority of the network device, where the type of the third Ethernet port is the second type.

If both the type of the Ethernet port and the root MAC address need to be negotiated, the root negotiation frame received by the network device includes the root MAC address of the network device and the root priority of the network device. The loop avoidance device further includes a third modification module. The type of the Ethernet port of the network device that receives the root negotiation frame may be the first type or may be the second type. If the type of the Ethernet port that receives the root negotiation frame is the second type, the network device does not need to modify the type of the Ethernet port. If the type of the Ethernet port that receives the root negotiation frame is the first type, the third modification module of the network device modifies the type of the Ethernet port into the second type in response to receiving the root negotiation frame. If the root priority of the network device that sends the root negotiation frame is higher than the root priority of the network device, the third modification module of the network device modifies the root MAC address of the network device into the root MAC address of the network device that sends the root negotiation frame and modifies the root priority of the network device into the root priority of the network device that sends the root negotiation frame. If the root priority of the network device that sends the root negotiation frame is lower than the root priority of the network device, the third modification module of the network device does not need to modify the root MAC address or the root priority. For example, the receiving module 404 is further configured to receive a fourth root negotiation frame using a fifth Ethernet port of the network device, where the fourth root negotiation frame includes a root MAC address of a network device that sends the fourth root negotiation frame and a root priority of the network device that sends the fourth root negotiation frame, and a type of the fifth Ethernet port is the first type. The third modification module is configured to modify the type of the fifth Ethernet port into the second type. If the root priority of the network device that sends the fourth root negotiation frame is higher than the root priority of the network device, the third modification module is further configured to modify the root MAC address of the network device into the root MAC address of the network device that sends the fourth root negotiation frame and modify the root priority of the network device into the root priority of the network device that sends the fourth root negotiation frame.

FIG. 5 is a structural diagram of a network device according to an embodiment of the present invention. The network device may be any network device in FIG. 2.

The network device may be a network switch or another type of network device used as a MAC bridge. The network device includes a processor 502, a memory 504, multiple Ethernet ports 506 and a bus. The processor 502 is connected to the memory 504. The processor 502 is connected to the multiple Ethernet ports 506. In a general implementation, the processor 502 is connected to the memory 504 by using the bus. The bus is denoted by using a thick line in FIG. 5.

The network device has a MAC address specially used for detecting a loop, referred to as a root MAC address. To be distinguished from the root MAC address, a physical address of the network device is referred to as a network bridge MAC address. Ethernet ports of a network device are distinguished into two types: a first type and a second type. An Ethernet port whose type is the first type is an Ethernet port that may be connected to an external network. An Ethernet port whose type is the second type is an Ethernet port connected to another network device in an internal network. Which Ethernet ports of the multiple Ethernet ports 506 of the network device are of the second type may be preset according to a topology of an internal network, or may be dynamically set through negotiation. For an example of negotiating a type of an Ethernet port, refer to description elsewhere herein.

The topology of the internal network is loop-free. It may be ensured that the internal network has no loop during physical connection, or some ports of network devices in the internal network may be blocked through pre-configuration that the internal network has no loop, or some ports of network devices in the internal network may be blocked by means of a loop breaking protocol that the internal network has no loop.

Multiple network devices in the internal network all use a same root MAC address to detect a loop. Network bridge MAC addresses of all network devices in the internal network are all different from the root MAC address; or, a network bridge MAC address of only one network device of all network devices in the internal network is the same as the root MAC address, and network bridge MAC addresses of all other network devices are all different from the root MAC address. A loop detection frame sent by each network device of the multiple network devices in the internal network uses the root MAC address as a source address. Root MAC addresses of all network devices in the internal network are the same, and if the external network forms a loop between two different network devices, these two network devices may receive a loop detection frame from each other, and a source address of the loop detection frame is the same as root MAC addresses of these two network devices, and therefore it may be determined simply and easily that a loop exists.

The root MAC addresses of all the network devices in the internal network may be preset to enable the root MAC addresses of all the network devices to be the same. Alternatively, a negotiation manner may be used to enable the root MAC addresses of all the network devices in the internal network to be the same. After negotiation is completed, the root MAC addresses of all the network devices in the internal network are root MAC addresses in the internal network whose initial root priorities are the highest. For an example of negotiating a root MAC address, refer to description elsewhere herein.

The processor 502 may be a central processing unit (CPU) 503, a network processor (NP) 505 or a combination of a CPU 503 and an NP 505. The processor 502 may further include a hardware chip. The foregoing hardware chip may be an application-specific integrated circuit (ASIC), a programmable logic device (PLD) or a combination thereof The foregoing PLD may be a complex programmable logic device (CPLD), a field-programmable gate array (FPGA), a generic array logic (GAL) or any combination thereof One of possible structures is described in FIG. 5 using a combination of a CPU 503 and an NP 505, and the structure is denoted by a dashed line in the figure, so as to indicate that the structure is only one possible option.

The multiple Ethernet ports 506 include a first Ethernet port and a second Ethernet port, a type of the first Ethernet port is a first type, a type of the second Ethernet port is the first type, a loop avoidance priority of the first Ethernet port is a first loop avoidance priority, and a loop avoidance priority of the second Ethernet port is a second loop avoidance priority.

A status of each Ethernet port of the multiple Ethernet ports 506 may be up, down, blocked or the like. After an Ethernet port of a network device is connected to another network device using an Ethernet cable, a status of the Ethernet port is changed into UP.

The memory 504 may include a volatile memory, such as a random-access memory (RAM); the memory 504 may also include a non-volatile memory, such as a read-only memory (ROM), a flash memory, a hard disk drive (HDD) or a solid-state drive (SSD); the memory 504 may further include a combination of the foregoing types of memories. The memory 504 is configured to store the root MAC address of the network device, where the root MAC address of the network device and the network bridge MAC address of the network device are different. The memory 504 may be further configured to store the network bridge MAC address of the network device. The memory 504 may be further configured to store a port priority of each Ethernet port of the network device.

The processor 502 is configured to send a first loop detection frame using the first Ethernet port, where the first loop detection frame includes the first loop avoidance priority, and a source address of the first loop detection frame is the root MAC address of the network device.

The processor 502 may send the loop detection frame using all Ethernet ports of the first type and in the UP state. Optionally, if a status of an Ethernet port is changed into UP, the processor 502 sends a loop detection frame using the Ethernet port. Alternatively, the processor 502 may periodically send a loop detection frame using an Ethernet port whose status is UP.

The loop detection frame may be a broadcast frame or may be a multicast frame. The loop detection frame has a specific format to indicate a purpose of the frame, that is, a frame specially used for detecting whether a loop exists in the external network. For example, a value of an EtherType field of a loop detection frame is a special value, and the special value is used to indicate that a broadcast frame or a multicast frame whose value of an EtherType field is the special value is a loop detection frame. For another example, a loop detection frame is a multicast frame, a destination address of the loop detection frame is a specific group MAC address, such as 01-80-C2-00-00-13, and the specific group MAC address is used to indicate that a multicast frame whose destination address is the specific group MAC address is a loop detection frame.

The loop detection frame includes a loop avoidance priority field, and a value of the loop avoidance priority field is a loop avoidance priority of an Ethernet port that sends the loop detection frame. A source address of the loop detection frame is a root MAC address of a network device that sends the loop detection frame. Loop avoidance priorities of any two of all Ethernet ports of all the network devices in the internal network are different from each other.

The processor 502 is further configured to receive a second loop detection frame using the second Ethernet port, where a source address of the second loop detection frame is the root MAC address, and the second loop detection frame includes a third loop avoidance priority. The processor 502 is further configured to compare the second loop avoidance priority with the third loop avoidance priority, and if the third loop avoidance priority is higher than the second loop avoidance priority, the processor 502 blocks the second Ethernet port, and discards the second loop detection frame.

The loop detection frame sent by the network device is a broadcast frame or a multicast frame, and therefore if an Ethernet port of the network device is connected to another Ethernet port of the network device using the external network, the other Ethernet port receives the loop detection frame. Alternatively, if an Ethernet port of the network device is connected to an Ethernet port of another network device in the internal network in which the network device is located, the Ethernet port of the other network device receives the loop detection frame, and the Ethernet port of the network device receives a loop detection frame sent by the Ethernet port, of the other network device, connected to the network device. The Ethernet port of the network device may be directly connected to another Ethernet port of the network device or an Ethernet port of another network device in the internal network in which the network device is located using an Ethernet cable. Alternatively, the Ethernet port of the network device may be connected to another Ethernet port of the network device or an Ethernet port of another network device in the internal network in which the network device is located using one or more network devices in the external network.

The processor 502 receives the second loop detection frame using the second Ethernet port, and in another aspect, because the type of the second Ethernet port is the first type, the Ethernet port that sends the second loop detection frame also receives the loop detection frame sent by the processor 502 using the second Ethernet port. One of the second Ethernet port and the Ethernet port that sends the second loop detection frame is to be blocked. Which one of these two Ethernet ports is blocked is determined by loop avoidance priorities of these two Ethernet ports. The Ethernet port with a lower loop avoidance priority is blocked.

High and low loop avoidance priorities mentioned herein do not refer to magnitudes of values of the loop avoidance priorities, but refer to a sequence in which Ethernet ports with different loop avoidance priorities are blocked. For example, a totally-ordered set may be stipulated, and a loop avoidance priority of each Ethernet port in the internal network is an element in the totally-ordered set, and a totally-ordered relationship of the totally-ordered set is used to define of any two loop avoidance priorities. For example, a loop avoidance priority is a positive integer, and a smaller one of the two loop avoidance priorities has a higher loop avoidance priority, or a larger one of the two loop avoidance priorities has a higher loop avoidance priority. For another example, a loop avoidance priority is a combination of a port priority of an Ethernet port of a network device and a network bridge MAC address of the network device. In the two loop avoidance priorities, a smaller network bridge MAC address value indicates a higher loop avoidance priority, or a larger network bridge MAC address value indicates a higher loop avoidance priority. If network bridge MAC addresses values are the same, a higher port priority of an Ethernet port indicates a higher loop avoidance priority in the two loop avoidance priorities. Network bridge MAC addresses of network devices are different from each other, and a single device may ensure that port priorities of Ethernet ports of the device are different from each other; therefore, it may be ensured that loop avoidance priorities of any two of all Ethernet ports of all network devices in the internal network are different from each other, and any two loop avoidance priorities may be compared. The loop avoidance priority of each Ethernet port of the multiple Ethernet ports 506 is stored in the memory 504.

If the forwarding is completed by the CPU in the network device, the foregoing operations are all executed by the CPU. The memory 504 stores instruction code, and the CPU executes the foregoing operations according to the instruction code in the memory 504.

If the forwarding is completed by the NP in the network device, the foregoing operations may be all executed by the NP, or may be executed by the NP in cooperation with the CPU. If the foregoing operations are all executed by the NP, the NP sends the first loop detection frame. If the foregoing operations are executed by the NP in cooperation with the CPU, the CPU sends the first loop detection frame.

To determine whether the received frame is a loop detection frame, the network device may further include a content-addressable memory (CAM), such as a ternary CAM (TCAM). One of possible structures is described in FIG. 5 by using that the network device includes a CAM, and the structure is denoted by a dashed line in the figure, so as to indicate that the structure is only one possible option. The CAM stores an access control list (ACL) matching characteristics of the loop detection frame. The CAM is connected to the NP, and the NP submits a to-be-forwarded frame to the CAM to execute an ACL operation, and finds a loop detection frame from a received Ethernet frame. The network device may determine whether a source address of the found loop detection frame is a root MAC address. The ACL may include a root MAC address to match a loop detection frame whose source address is the root MAC address. The ACL may also not include any root MAC address, and after a loop detection frame is found, the NP determines whether a source address of the loop detection frame is a root MAC address. If the ACL includes a root MAC address to match a loop detection frame whose source address is the root MAC address, the ACL may include another ACL to match a loop detection frame whose source address is not the root MAC address, so as to discard the loop detection frame whose source address is not the root MAC address.

If the foregoing operations are all executed by the NP, after finding the second loop detection frame whose source address is the root MAC address, the NP compares the second loop avoidance priority with the third loop avoidance priority, and if the third loop avoidance priority is higher than the second loop avoidance priority, the NP blocks the second Ethernet port, and discards the second loop detection frame. If the foregoing operations are executed by the NP in cooperation with the CPU, after finding the second loop detection frame whose source address is the root MAC address, the NP sends the second loop detection frame to the CPU, the CPU compares the second loop avoidance priority with the third loop avoidance priority, and if the third loop avoidance priority is higher than the second loop avoidance priority, the CPU blocks the second Ethernet port, and discards the second loop detection frame. If the foregoing operations are executed by the NP in cooperation with the CPU, the memory 504 stores instruction code, and the CPU executes, according to the instruction code in the memory 504, the foregoing operations executed by the CPU.

If forwarding is completed by a hardware chip in the network device, such as an ASIC or FPGA, the foregoing operations may be executed by the hardware chip in cooperation with the CPU. The memory 504 stores instruction code, and the CPU executes, according to the instruction code in the memory 504, the following operations executed by the CPU. The CPU sends the first loop detection frame.

To determine whether the received frame is a loop detection frame, the network device may further include a CAM 501, such as a TCAM. The CAM 501 stores an ACL matching characteristics of the loop detection frame. The CAM 501 is connected to the hardware chip, and the hardware chip submits a to-be-forwarded frame to the CAM 501 to execute an ACL operation, and finds a loop detection frame from a received Ethernet frame, The network device may determine whether a source address of the found loop detection frame is a root MAC address. The ACL may include a root MAC address to match a loop detection frame whose source address is the root MAC address. The ACL may also not include any root MAC address, and after a loop detection frame is found, the hardware chip determines whether a source address of the loop detection frame is a root MAC address. If the ACL includes a root MAC address to match a loop detection frame whose source address is the root MAC address, the ACL may include another ACL to match a loop detection frame whose source address is not the root MAC address, so as to discard the loop detection frame whose source address is not the root MAC address.

After finding the second loop detection frame whose source address is the root MAC address, the hardware chip sends the second loop detection frame to the CPU, the CPU compares the second loop avoidance priority with the third loop avoidance priority, and if the third loop avoidance priority is higher than the second loop avoidance priority, the CPU blocks the second Ethernet port, and discards the second loop detection frame.

In some network architectures, such as a software-defined networking (SDN) architecture, the CPU executing comparison of loop avoidance priorities may be located in an independent device, such as a controller, after finding a loop detection frame whose source address is the root MAC address, the hardware chip, the NP or the CPU of the network device sends the loop detection frame to the controller, and the controller decides whether to block a port receiving the loop detection frame. Because that operations executed by a combination of the hardware chip, the NP or the CPU of the network device and the processor of the controller are the same as that operations executed by the NP in cooperation with the CPU or operations executed by the hardware chip in cooperation with the CPU, a combination of the hardware chip, the NP or the CPU of the network device and the independent controller may be used as the processor of the network device, to form an implementation of this embodiment of the present disclosure.

Because a processor blocks, according to a loop avoidance priority, an Ethernet port whose type is a first type, that is, an Ethernet port connected to an external network, it is avoided to change a topology of an internal network.

A scenario of negotiation of an internal network is described below. The negotiation of the internal network includes two parts: negotiating a type of an Ethernet port and negotiating a root MAC address, and these two parts may be separately and independently implemented and may also be jointly implemented.

In the scenario of negotiation of the internal network, the processor 502 is further configured to send and receive a root negotiation frame. The root negotiation frame may be sent and received by the CPU, and may also be sent and received by the NP. The root negotiation frame is a frame used to negotiate a type of an Ethernet port or negotiate a root MAC address between two network devices in an internal network. The root negotiation frame may be not only used to negotiate the type of Ethernet port but also used to negotiate the root MAC address. The root negotiation frame may be a customized PDU, or may be a PDU of an extended conventional protocol, such as an LLDPDU. A source MAC address of the root negotiation frame is a network bridge MAC address of a network device that sends the root negotiation frame. A destination MAC address of the root negotiation frame is a network bridge MAC address of a network device that receives the root negotiation frame, or a specific multicast address.

If the type of the Ethernet port is preset, a type of an Ethernet port, of the multiple Ethernet ports 506 of the network device, connected to another network device in the internal network in which the network device is located is already preset to a second type. In this case, a root MAC address needs to be negotiated. The root negotiation frame sent by the processor 502 includes a root MAC address of the network device and a root priority of the network device. The root priority is used to determine a priority of the root MAC address. An initial root MAC address of the network device may be the same as the network bridge MAC address of the network device, or may be different from the network bridge MAC address of the network device. Root priorities of any two of all network devices in the internal network are different from each other. The processor 502 sends the root negotiation frame using all Ethernet ports whose types are the second type. Because the type of the Ethernet port is preset according to a topology of the internal network, the processor 502 receives, only using an Ethernet port whose type is the second type, a root negotiation frame sent by another network device. For example, the multiple Ethernet ports 506 further include a third Ethernet port, and a type of the third Ethernet port is a second type. The processor 502 sends a first root negotiation frame using a third Ethernet port, and the first root negotiation frame includes the root MAC address of the network device and a root priority of the network device.

Because the type of the Ethernet port is preset according to a topology of the internal network, the processor 502 receives, only using an Ethernet port whose type is the second type, a root negotiation frame sent by another network device. If the root priority of the network device that sends the root negotiation frame is higher than the root priority of the network device, the processor 502 modifies the root MAC address of the network device into the root MAC address of the network device that sends the root negotiation frame and modifies the root priority of the network device into the root priority of the network device that sends the root negotiation frame. If the root priority of the network device that sends the root negotiation frame is lower than the root priority of the network device, the processor 502 does not need to modify the root MAC address or the root priority. High and low root priorities mentioned herein do not refer to magnitudes of values of the root priorities, but refer to a sequence in which root MAC addresses of different root priorities are designated as a unique root MAC address of the entire internal network. For example, a totally-ordered set may be stipulated, and a root priority of each network device in the internal network is an element in the totally-ordered set, and a totally-ordered relationship of the totally-ordered set is used to define any two root priorities. For example, a root priority is a positive integer, and a smaller one of the two root priorities has a higher root priority, or a larger one of the two root priorities has a higher root priority. For another example, a root priority is a value of a root MAC address, that is, in a root negotiation frame, it is not required that two fields separately carry the root MAC address and the root priority of the network device that sends the root negotiation frame, but it is only required that one field carries the root MAC address of the network device that sends the root negotiation frame, that is, the root priority of the network device. The smaller one in two root MAC addresses indicates a higher root priority, or the larger one of the two root MAC addresses indicates a higher root priority. Because a root MAC address itself is a root priority, modifying a root MAC address is equivalent to modifying a root priority, and if a root MAC address needs to be modified and a root priority needs to be modified, only the root MAC address needs to be modified, that is, it is equivalent to that the root MAC address is modified and the root priority is modified. However, if the root priority is another value different from the root MAC address, the root priority may be stored in the memory 504. For example, the processor 502 is further configured to receive a second root negotiation frame using the third Ethernet port, where the second root negotiation frame includes a root MAC address of a network device that sends the second root negotiation frame and a root priority of the network device that sends the second root negotiation frame. If the root priority of the network device that sends the second root negotiation frame is higher than the root priority of the network device, the processor 502 modifies the root MAC address of the network device into the root MAC address of the network device that sends the second root negotiation frame and modifies the root priority of the network device into the root priority of the network device that sends the second root negotiation frame.

If the root MAC address of the network device in the internal network is preset, root MAC addresses of all network devices in the internal network in which the network device is located are already preset to a same root MAC address. In this case, a type of an Ethernet port needs to be negotiated. The root negotiation frame may not include the root MAC address of the network device or the root priority of the network device. Some Ethernet ports in the network device are already designated as Ethernet ports specially used for connecting to other network devices in the internal network, that is, types of the some Ethernet ports in the network device are already designated as the second type. Types of other Ethernet ports in the network device are set to the first type by default. For example, a type of an uplink port in the network device is designated as the second type. Alternatively, types of one or more Ethernet ports 506, of the Ethernet ports in the network device, whose port identifier values are smallest or largest are designated as the second type. When the internal network is established, it is required that two Ethernet ports not specially used for connecting to other network devices in the internal network cannot be interconnected, or at least one of two connected Ethernet ports not specially used for connecting to other network devices in the internal network is in a blocked state. After the internal network is established, the processor 502 sends the root negotiation frame using all Ethernet ports whose types are the second type. For example, the processor 502 sends the first root negotiation frame using the third Ethernet port, where the type of the third Ethernet port is the second type.

The processor 502 may receive a root negotiation frame using an Ethernet port whose type is the first type, or may receive a root negotiation frame using an Ethernet port whose type is the second type. If the processor 502 receives a root negotiation frame using an Ethernet port whose type is the second type, the processor 502 does not need to perform further processing. If the processor 502 receives a root negotiation frame using an Ethernet port whose type is the first type, in response to receiving the root negotiation frame, the processor 502 modifies the type of the Ethernet port into the second type. For example, the network device further includes a fourth Ethernet port, and a type of the fourth Ethernet port is the first type. After receiving a third root negotiation frame using the fourth Ethernet port, the processor 502 modifies the type of the fourth Ethernet port into the second type.

If both the type of the Ethernet port and the root MAC address need to be negotiated, the root negotiation frame sent by the processor 502 includes the root MAC address of the network device and the root priority of the network device. Some Ethernet ports in the network device are already designated as Ethernet ports specially used for connecting to other network devices in the internal network, that is, types of the some Ethernet ports in the network device are already designated as the second type. Types of other Ethernet ports in the network device are set to the first type by default. For example, a type of an uplink port in the network device is designated as the second type. After the internal network is established, the processor 502 sends the root negotiation frame using all Ethernet ports of the network device whose types are the second type. For example, the processor 502 sends a first root negotiation frame using the third Ethernet port, where the first root negotiation frame includes the root MAC address of the network device and the root priority of the network device, where the type of the third Ethernet port is the second type.

If both the type of the Ethernet port and the root MAC address need to be negotiated, the root negotiation frame received by the processor 502 includes the root MAC address of the network device and the root priority of the network device. The processor 502 may receive a root negotiation frame using an Ethernet port whose type is the first type, or may also receive a root negotiation frame using an Ethernet port whose type is the second type. If the processor 502 receives a root negotiation frame using an Ethernet port whose type is the second type, the processor 502 does not need to modify the type of the Ethernet port. If the processor 502 receives a root negotiation frame using an Ethernet port whose type is the first type, in response to receiving the root negotiation frame, the processor 502 modifies the type of the Ethernet port into the second type. The processor 502 modifies the root MAC address of the network device into the root MAC address of the network device that sends the root negotiation frame and modifies the root priority of the network device into the root priority of the network device that sends the root negotiation frame if the root priority of the network device that sends the root negotiation frame is higher than the root priority of the network device. If the root priority of the network device that sends the root negotiation frame is lower than the root priority of the network device, the processor 502 does not need to modify the root MAC address or the root priority. For example, the network device further includes a fifth Ethernet port, and a type of the fifth Ethernet port is the first type. The processor 502 receives a fourth root negotiation frame using the fifth Ethernet port, where the fourth root negotiation frame includes a root MAC address of a network device that sends the fourth root negotiation frame and a root priority of the network device that sends the fourth root negotiation frame. If the root priority of the network device that sends the fourth root negotiation frame is higher than the root priority of the network device, the processor 502 modifies the type of the fifth Ethernet port into the second type. The processor 502 modifies the root MAC address of the network device into the root MAC address of the network device that sends the fourth root negotiation frame and modifies the root priority of the network device into the root priority of the network device that sends the fourth root negotiation frame.

Persons of ordinary skill in the art may understand that all or a part of the steps in each of the foregoing method of the embodiments may be implemented by a program instructing a processor. The foregoing program may be stored in a computer readable storage medium. The storage medium may be a random-access memory, read-only memory, a flash memory, a hard disk, a solid state drive, a magnetic tape, a floppy disk, an optical disc, or any combination thereof.

The foregoing descriptions are merely exemplary implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:
1. A method, comprising:
   sending, by a network device, a first loop detection frame using a first Ethernet port that is a first edge port, the network device having a network bridge media access control (MAC) address that is a physical address of the network device, the first Ethernet port having a first loop avoidance priority, the first loop detection frame comprising the first loop avoidance priority and a first source address field comprising a root MAC address, the root MAC address being different than the network bridge MAC address and being used for detecting a loop;
   receiving, by the network device, a second loop detection frame using a second Ethernet port, the second loop detection frame comprising a second source address field comprising the root MAC address and a second loop avoidance priority, and the second Ethernet port having a third loop avoidance priority;
   comparing the second loop avoidance priority with the third loop avoidance priority to determine whether to block the second Ethernet port;
   blocking, by the network device, the second Ethernet port when the second loop avoidance priority is higher than the third loop avoidance priority; and
   discarding, by the network device, the second loop detection frame.
2. The method of claim 1, further comprising:
   sending, by the network device, a first root negotiation frame using a third Ethernet port, the first root negotiation frame comprising the root MAC address and a root priority of the network device, and the third Ethernet port being an internal port;

receiving, by the network device, a second root negotiation frame using the third Ethernet port, the second root negotiation frame comprising a second root MAC address of a second network device from which the second root negotiation frame is received and a second root priority of the second network device;

replacing, by the network device, the root MAC address with the second root MAC address when the second root priority is higher than the root priority of the network device; and replacing the root priority of the network device with the second root priority when the second root priority is higher than the root priority.

3. The method of claim 1, further comprising:

receiving, by the network device, a third root negotiation frame using a third Ethernet port that is designated as a second edge port; and redesignating, by the network device, the third Ethernet port as a second internal port.

4. The method of claim 1, further comprising:

receiving, by the network device, a third root negotiation frame using a third Ethernet port, the third root negotiation frame comprising a second root MAC address of a second network device from which the third root negotiation frame is received and a second root priority of the second network device, and the third Ethernet port being designated as a second edge port;

redesignating, by the network device, the third Ethernet port as a second internal port;

replacing, by the network device, the root MAC address with the second root MAC address when the second root priority is higher than a root priority of the network device; and replacing the root priority of the network device with the second root priority when the second root priority is higher than the root priority.

5. The method of claim 1, further comprising allowing further sending and receiving on the second Ethernet port when the third loop avoidance priority is lower than the second loop avoidance priority.

6. The method of claim 1, wherein the first loop detection frame further comprises an ether type field entry that indicates that the first loop detection frame is used for loop detection.

7. A network device having a network bridge media access control (MAC) address that is a physical address of the network device, the network device comprising:

a memory configured to store a root media access control (MAC) address used for detecting a loop, the network bridge MAC address being different than the root MAC address;

a first Ethernet port that is an edge port, the first Ethernet port having a first loop avoidance priority;

a second Ethernet port having a second loop avoidance priority;

a processor coupled to the memory, the first Ethernet port, and the second Ethernet port, the processor being configured to:

send a first loop detection frame using the first Ethernet port the first loop detection frame comprising the first loop avoidance priority and a first source address field comprising the root MAC address;

receive a second loop detection frame using the second Ethernet port, the second loop detection frame comprising a third loop avoidance priority and a second source address field comprising the root MAC address;

compare the second loop avoidance priority with the third loop avoidance priority to determine whether to block the second Ethernet port;

block the second Ethernet port when the third loop avoidance priority is higher than the second loop avoidance priority; and discard the second loop detection frame when the third loop avoidance priority is higher than the second loop avoidance priority.

8. The network device of claim 7, comprising a third Ethernet port that is an internal port, the processor is further configured to:

send a first root negotiation frame using the third Ethernet port, the first root negotiation frame comprising the root MAC address and a root priority of the network device;

receive a second root negotiation frame using the third Ethernet port, the second root negotiation frame comprising a second root MAC address of a second network device from which the second root negotiation frame is received and a second root priority of the second network device;

replace the root MAC address with the second root MAC address when the second root priority higher than the root priority; and replace the root priority of the network device with the second root priority when the second root priority is higher than the root priority of the network device.

9. The network device claim 7, wherein the network device further comprises a third Ethernet port that is designated as a second edge port, and the processor is further configured to:

receive a root negotiation frame using the third Ethernet port; and redesignate the third Ethernet port as an internal port.

10. The network device of claim 7, wherein the network device further comprises a third Ethernet port that is designated as a second edge port, and the processor is further configured to:

receive a root negotiation frame using the third Ethernet port, the root negotiation frame comprising a second root MAC address of a second network device from which the root negotiation frame is received and a second root priority of the second network device;

redesignate the third Ethernet port as an internal port;

replace the root MAC address with the second root MAC address when the second root priority is higher than a root priority of the network device; and replace the root priority with the second root priority when the root priority of the second network device is higher than the root priority.

11. The network device of claim 7, further comprising allowing further sending and receiving on the second Ethernet port when the third :loop avoidance priority is lower than the second loop avoidance priority.

12. The network device of claim 7, wherein the first loop detection frame and the second loop detection frame each further comprises an ether type field entry that indicates that the first loop detection frame and the second loop detection frame are used for loop detection.

13. The network device of claim 7, wherein the first loop detection frame further comprises a loop avoidance priority field.

14. A network device comprising:

a first Ethernet edge port having a first loop avoidance priority and configured to send a first Ethernet frame, the first Ethernet frame comprising a first source address field, the first loop avoidance priority, and an indication that the first Ethernet frame is for loop detection, and the first source address field comprising a root media access control (MAC) address that is used for loop detection;

a second Ethernet edge port having a second loop avoidance priority and configured to receive a second Ethernet frame, the second Ethernet frame comprising a second source address field, a third loop avoidance priority, and the indication that the second Ethernet frame is for loop detection, and the second source address field comprising the root MAC address; and a processor coupled to the first Ethernet edge port and the second Ethernet edge port and configured to:

compare the second loop avoidance priority with the third loop avoidance priority to determine whether to block the second Ethernet edge port;

block the second Ethernet edge port when the third loop avoidance priority is higher than the second loop avoidance priority; and discard the second Ethernet frame.

15. The network device of claim 14, wherein the indication that the first Ethernet frame is for loop detection is an ether type field entry that indicates that the first Ethernet frame is for loop detection.

16. The network device of claim 14, wherein the first Ethernet frame further comprises a loop avoidance priority field.

17. The network device of claim 16, wherein the loop avoidance priority field indicates that the first Ethernet frame is for loop detection.

18. The network device of claim 16, wherein the processor is further configured to allow further sending and receiving on the second Ethernet edge port when the third loop avoidance priority is lower than the second loop avoidance priority.

19. The network device of claim 14, wherein the first Ethernet frame is a multicast frame.

20. The network device of claim 14, wherein the first Ethernet frame is a broadcast frame.

* * * * *

UNITED STATES PATENT AND TRADEMARK OFFICE
CERTIFICATE OF CORRECTION

PATENT NO. : 10,142,217 B2
APPLICATION NO. : 14/949451
DATED : November 27, 2018
INVENTOR(S) : Bin Yu, Xiaohu Tang and Ting Xu Page 1 of 1

It is certified that error appears in the above-identified patent and that said Letters Patent is hereby corrected as shown below:

On the Title Page

Item (30), Line 1: "201410687509" should read "201410687509.8"

In the Claims

Column 38, Line 13: Claim 7 insert --further-- before "comprising"

Column 38, Line 27: Claim 8 insert --is-- after "priority"

Column 38, Line 32: Claim 8 insert --of-- after "device"

Column 38, Line 57: Claim 11 delete ":" before "loop"

Signed and Sealed this
Twenty-second Day of January, 2019

Andrei Iancu
*Director of the United States Patent and Trademark Office*